US00RE44054E

(19) United States
(12) Reissued Patent
Kim

(10) Patent Number: US RE44,054 E
(45) Date of Reissued Patent: Mar. 5, 2013

(54) GRAPHIC CHATTING WITH ORGANIZATIONAL AVATARS

(75) Inventor: Kyunam Kim, Los Altos, CA (US)

(73) Assignee: Ganz, Woodbridge, Ontario

(21) Appl. No.: 11/820,500

(22) Filed: Jun. 19, 2007

Related U.S. Patent Documents

Reissue of:
(64) Patent No.: 6,910,186
Issued: Jun. 21, 2005
Appl. No.: 09/732,628
Filed: Dec. 8, 2000

(51) Int. Cl.
*G06F 3/048* (2006.01)
*G06F 3/00* (2006.01)
*G06F 15/16* (2006.01)

(52) U.S. Cl. ..... 715/706; 715/751; 715/758; 715/715; 715/733; 715/752; 709/204

(58) Field of Classification Search ..... 715/706, 715/753, 751, 758, 733, 715, 752; 709/204
See application file for complete search history.

(56) References Cited

U.S. PATENT DOCUMENTS

| | | | | |
|---|---|---|---|---|
| 5,255,834 | A * | 10/1993 | Bendersky | 224/657 |
| 5,411,259 | A | 5/1995 | Pearson | |
| 5,544,320 | A | 8/1996 | Konrad | 395/200.09 |
| 5,606,652 | A | 2/1997 | Silverbrook | 395/135 |
| 5,659,692 | A * | 8/1997 | Poggio et al. | 345/756 |
| 5,682,469 | A | 10/1997 | Linnett et al. | |
| 5,684,943 | A | 11/1997 | Abraham et al. | 395/173 |
| 5,717,869 | A | 2/1998 | Moran et al. | 395/339 |
| 5,736,982 | A | 4/1998 | Suzuki et al. | |
| 5,802,296 | A | 9/1998 | Morse et al. | 395/200.38 |
| 5,822,428 | A * | 10/1998 | Gardner | 705/52 |

(Continued)

FOREIGN PATENT DOCUMENTS

| | | |
|---|---|---|
| CA | 2 475 463 A1 | 8/2003 |
| EP | 1 228 792 A1 | 8/2002 |

(Continued)

OTHER PUBLICATIONS

Johnson, M.P., et al., Sympathetic Interfaces: Using a Plush Toy to Direct Synthetic Characters. Proceedings of the CHI 99 Conference on Human Factors in Computing Systems, 1999.

(Continued)

*Primary Examiner* — Ting Lee
(74) *Attorney, Agent, or Firm* — Pearne & Gordon LLP

(57) ABSTRACT

A new class of avatars ("organizational avatars") created in accordance with the present invention holds a value or a significance independent from their use in a virtual environment, unlike the generic avatars whose value is limited to their being used in a chatroom. For example, an organizational avatar may be in the image of a trademark (which may be copyrighted), such as Mickey Mouse, Colonel Sanders, or Pikachu (a Pokemon character). The organizational avatars may represent certain organizations, typically the organizations that own trademark and/or copyright rights to the images used to form the avatars in virtual environments. Therefore, users of virtual environments can interface various companies by interacting with organizational avatars. Alternatively, organizational avatars may represent users independent of the organization, but under a contract with the organization that owns the image the avatars depict. By using organizational avatars, companies of all sizes can increase their interactivity with customers, advertise cost effectively, and promote a positive image for their products. Tiles are used to provide faster download of a chatroom's background. Tiles also allow rapid generation of a chatroom's background, eliminating the need to use a graphics editor.

38 Claims, 18 Drawing Sheets

U.S. PATENT DOCUMENTS

| | | | | |
|---|---|---|---|---|
| 5,853,327 | A | 12/1998 | Gilboa | |
| 5,880,731 | A | 3/1999 | Liles et al. | |
| 5,886,697 | A | 3/1999 | Naughton et al. | |
| 5,890,963 | A | 4/1999 | Yen | |
| 5,923,330 | A | 7/1999 | Tarlton | |
| 5,926,179 | A * | 7/1999 | Matsuda et al. | 715/752 |
| 5,956,038 | A | 9/1999 | Rekimoto | 345/419 |
| 5,959,281 | A | 9/1999 | Domiteaux | |
| 5,964,660 | A | 10/1999 | James et al. | |
| 5,966,526 | A | 10/1999 | Yokoi | |
| 6,009,458 | A | 12/1999 | Hawkins et al. | |
| 6,012,961 | A | 1/2000 | Sharpe, III et al. | |
| 6,031,549 | A | 2/2000 | Hayes-Roth | |
| 6,049,778 | A | 4/2000 | Walker et al. | |
| 6,057,856 | A | 5/2000 | Miyashita et al. | |
| 6,072,466 | A | 6/2000 | Shah et al. | |
| 6,081,830 | A | 6/2000 | Schindler | |
| 6,159,101 | A | 12/2000 | Simpson | |
| 6,173,267 | B1 | 1/2001 | Cairns | |
| 6,175,857 | B1 | 1/2001 | Hachiya et al. | |
| 6,200,216 | B1 | 3/2001 | Peppel | |
| 6,210,272 | B1 | 4/2001 | Brown | |
| 6,219,045 | B1 | 4/2001 | Leahy et al. | |
| 6,227,931 | B1 | 5/2001 | Shackelford | |
| 6,227,966 | B1 | 5/2001 | Yokoi | |
| 6,251,017 | B1 | 6/2001 | Leason et al. | |
| 6,253,167 | B1 | 6/2001 | Matsuda | |
| 6,267,672 | B1 | 7/2001 | Vance | |
| 6,268,872 | B1 | 7/2001 | Matsuda et al. | |
| 6,273,815 | B1 | 8/2001 | Stuckman et al. | |
| 6,290,565 | B1 | 9/2001 | Galyean, III et al. | |
| 6,290,566 | B1 | 9/2001 | Gabai et al. | |
| 6,311,195 | B1 | 10/2001 | Hachiya et al. | |
| 6,349,301 | B1 | 2/2002 | Mitchell et al. | |
| 6,352,478 | B1 | 3/2002 | Gabai et al. | |
| 6,356,867 | B1 | 3/2002 | Gabai et al. | |
| 6,368,177 | B1 | 4/2002 | Gabai et al. | |
| 6,388,665 | B1 | 5/2002 | Linnett et al. | |
| 6,394,872 | B1 | 5/2002 | Watanabe et al. | |
| 6,404,438 | B1 | 6/2002 | Hatlelid et al. | |
| 6,406,370 | B1 | 6/2002 | Kumagai | |
| 6,449,518 | B1 | 9/2002 | Yokoo et al. | |
| 6,476,830 | B1 | 11/2002 | Farmer et al. | |
| 6,493,001 | B1 * | 12/2002 | Takagi et al. | 715/759 |
| 6,494,762 | B1 | 12/2002 | Bushmitch et al. | |
| 6,519,771 | B1 | 2/2003 | Zenith | |
| 6,522,333 | B1 | 2/2003 | Hatlelid et al. | |
| 6,539,400 | B1 | 3/2003 | Bloomfield et al. | |
| 6,554,679 | B1 | 5/2003 | Yokoo et al. | |
| 6,559,863 | B1 * | 5/2003 | Megiddo | 715/753 |
| 6,560,511 | B1 | 5/2003 | Yokoo et al. | |
| 6,572,431 | B1 | 6/2003 | Maa | |
| 6,587,834 | B1 | 7/2003 | Dixon, III | |
| 6,595,858 | B1 | 7/2003 | Tajiri et al. | |
| 6,609,968 | B1 | 8/2003 | Okada et al. | |
| 6,612,501 | B1 | 9/2003 | Woll et al. | |
| 6,616,532 | B2 | 9/2003 | Albrecht | |
| 6,650,761 | B1 | 11/2003 | Rodriguez et al. | |
| 6,663,105 | B1 | 12/2003 | Sullivan | |
| 6,685,565 | B2 | 2/2004 | Tanibuchi et al. | |
| 6,692,360 | B2 | 2/2004 | Kusuda et al. | |
| 6,704,784 | B2 | 3/2004 | Matsuda | |
| 6,719,604 | B2 | 4/2004 | Chan | |
| 6,720,949 | B1 | 4/2004 | Pryor et al. | |
| 6,727,925 | B1 | 4/2004 | Bourdelais | |
| 6,734,884 | B1 | 5/2004 | Berry et al. | |
| 6,734,885 | B1 * | 5/2004 | Matsuda | 715/848 |
| 6,735,324 | B1 | 5/2004 | McKinley et al. | |
| 6,739,941 | B1 | 5/2004 | Brownsberger | |
| 6,772,195 | B1 * | 8/2004 | Hatlelid et al. | 709/204 |
| 6,773,325 | B1 | 8/2004 | Mawle et al. | |
| 6,773,344 | B1 | 8/2004 | Gabai et al. | |
| 6,813,605 | B2 * | 11/2004 | Nakamura et al. | 704/270 |
| 6,845,486 | B2 | 1/2005 | Yamada et al. | |
| 6,910,186 | B2 | 6/2005 | Kim | |
| 6,954,728 | B1 | 10/2005 | Kusumoto et al. | |
| 6,959,166 | B1 | 10/2005 | Gabai et al. | |
| 7,039,940 | B2 | 5/2006 | Weatherford | |
| 7,042,440 | B2 | 5/2006 | Pryor et al. | |
| 7,054,831 | B2 | 5/2006 | Koenig | |
| 7,058,897 | B2 | 6/2006 | Matsuda | |
| 7,061,493 | B1 | 6/2006 | Cook | |
| 7,062,722 | B1 | 6/2006 | Carlin et al. | |
| 7,066,781 | B2 | 6/2006 | Weston | |
| 7,081,033 | B1 | 7/2006 | Mawle et al. | |
| 7,086,005 | B1 | 8/2006 | Matsuda | |
| 7,089,083 | B2 | 8/2006 | Yokoo et al. | |
| 7,143,358 | B1 * | 11/2006 | Yuen | 715/757 |
| 7,168,051 | B2 | 1/2007 | Robinson et al. | |
| 7,181,690 | B1 | 2/2007 | Leahy et al. | |
| 7,266,522 | B2 | 9/2007 | Dutta et al. | |
| 7,314,407 | B1 | 1/2008 | Pearson | |
| 7,425,169 | B2 | 9/2008 | Ganz | |
| 7,442,108 | B2 | 10/2008 | Ganz | |
| 7,448,231 | B2 | 11/2008 | Jeanvoine et al. | |
| 7,465,212 | B2 | 12/2008 | Ganz | |
| 7,478,047 | B2 | 1/2009 | Loyall et al. | |
| 7,488,231 | B2 | 2/2009 | Weston | |
| 7,534,157 | B2 | 5/2009 | Ganz | |
| 7,568,964 | B2 | 8/2009 | Ganz | |
| 7,604,525 | B2 | 10/2009 | Ganz | |
| 7,618,303 | B2 | 11/2009 | Ganz | |
| 7,677,948 | B2 | 3/2010 | Ganz | |
| 7,789,726 | B2 | 9/2010 | Ganz | |
| 7,850,527 | B2 | 12/2010 | Barney et al. | |
| 2001/0020955 | A1 | 9/2001 | Nakagawa et al. | |
| 2001/0031603 | A1 | 10/2001 | Gabai et al. | |
| 2001/0039206 | A1 | 11/2001 | Peppel | |
| 2002/0002514 | A1 | 1/2002 | Kamachi et al. | |
| 2002/0022523 | A1 | 2/2002 | Dan et al. | |
| 2002/0022992 | A1 | 2/2002 | Miller et al. | |
| 2002/0022993 | A1 | 2/2002 | Miller et al. | |
| 2002/0022994 | A1 | 2/2002 | Miller et al. | |
| 2002/0026357 | A1 | 2/2002 | Miller et al. | |
| 2002/0026358 | A1 | 2/2002 | Miller et al. | |
| 2002/0036617 | A1 | 3/2002 | Pryor | |
| 2002/0040327 | A1 | 4/2002 | Owa | |
| 2002/0054094 | A1 | 5/2002 | Matsuda | |
| 2002/0065746 | A1 * | 5/2002 | Lewis | 705/27 |
| 2002/0065890 | A1 * | 5/2002 | Barron | 709/206 |
| 2002/0068500 | A1 | 6/2002 | Gabai et al. | |
| 2002/0090985 | A1 | 7/2002 | Tochner | |
| 2002/0111808 | A1 | 8/2002 | Feinberg | |
| 2002/0147640 | A1 | 10/2002 | Daniele | |
| 2002/0160835 | A1 | 10/2002 | Fujioka et al. | |
| 2002/0169672 | A1 | 11/2002 | Barnhart | |
| 2003/0126031 | A1 | 7/2003 | Asami | |
| 2003/0220885 | A1 | 11/2003 | Lucarelli et al. | |
| 2003/0222902 | A1 | 12/2003 | Chupin et al. | |
| 2004/0030595 | A1 | 2/2004 | Park | |
| 2004/0046736 | A1 | 3/2004 | Pryor et al. | |
| 2004/0075677 | A1 | 4/2004 | Loyall et al. | |
| 2004/0193489 | A1 | 9/2004 | Boyd et al. | |
| 2005/0059483 | A1 | 3/2005 | Borge | |
| 2006/0093142 | A1 | 5/2006 | Schneier et al. | |
| 2006/0285441 | A1 | 12/2006 | Walker | |
| 2007/0050716 | A1 | 3/2007 | Leahy et al. | |
| 2008/0002666 | A1 | 1/2008 | Cope | |
| 2008/0009350 | A1 | 1/2008 | Ganz | |
| 2008/0009351 | A1 | 1/2008 | Ganz | |
| 2008/0040230 | A1 | 2/2008 | Ganz | |
| 2008/0040297 | A1 | 2/2008 | Ganz | |
| 2008/0109313 | A1 | 5/2008 | Ganz | |
| 2008/0134099 | A1 | 6/2008 | Ganz | |
| 2008/0163055 | A1 | 7/2008 | Ganz et al. | |
| 2009/0029768 | A1 | 1/2009 | Ganz | |
| 2009/0029772 | A1 | 1/2009 | Ganz | |
| 2009/0053970 | A1 | 2/2009 | Borge | |
| 2009/0054155 | A1 | 2/2009 | Borge | |
| 2009/0063282 | A1 | 3/2009 | Ganz | |
| 2009/0118009 | A1 | 5/2009 | Ganz | |
| 2009/0131164 | A1 | 5/2009 | Ganz | |
| 2009/0204420 | A1 | 8/2009 | Ganz | |
| 2010/0151940 | A1 | 6/2010 | Borge | |

FOREIGN PATENT DOCUMENTS

| | | | |
|---|---|---|---|
| JP | 2000-057373 | A | 2/2000 |
| JP | 2001-222585 | A | 8/2001 |
| JP | 2001222585 | | 8/2001 |
| JP | 2001-283024 | A | 10/2001 |
| JP | 2001-321571 | A | 11/2001 |
| JP | 2002-016171 | A | 1/2002 |
| JP | 2002-297498 | A | 10/2002 |
| KR | 2001-0073524 | A | 8/2001 |
| WO | 99/42917 | A2 | 8/1999 |
| WO | 0033533 | A1 | 6/2000 |
| WO | 01/69572 | A1 | 9/2001 |
| WO | 01/69829 | A2 | 9/2001 |
| WO | 01/69830 | A2 | 9/2001 |
| WO | 01/90841 | A2 | 11/2001 |
| WO | 02/22224 | A1 | 3/2002 |
| WO | 02/27591 | A1 | 4/2002 |
| WO | 02/099581 | A2 | 12/2002 |

OTHER PUBLICATIONS neopets.com "The Ottawa Citizen", dated Feb. 7, 2000.
Johnson, M. P., A. Wilson, B. Blumberg, C. Kline, and A. Bobick, Sympathetic interfaces: using a plush toy to direct synthetic characters. Proceedings of the CHI 99 conference on Human factors in computing systems, 1999.
Request for ExParte Reexamination of U.S. Patent No. 7,568,964 no Exhibits Nov. 1, 2010.
Order Granting Request for Inter Partes Reexamination of U.S. Patent No. 7,618,303 Nov. 8, 2010.
International Search Report for PCT/CA2009/000271 dated Sep. 7, 2010.
Canadian Search Report CA2665737; Oct. 26, 2010.
Right of Appeal notice for Inter Partes Reexamination of U.S. Patent No. 7,568,964 dated Jan. 15, 2011.
Right of Appeal notice for Inter Partes Reexamination of U.S. Patent No. 7,677,948 dated Jan. 18, 2011.
Notice of Appeal in Inter Partes Reexamination of of U.S. Patent No. 7,677,948 dated Feb. 17, 2011.
Notice of Appeal in Inter Partes Reexamination of of U.S. Patent No. 7,568,964 dated Feb. 10, 2011.
Search Report-AU-2009202829, dated Jan. 4, 2011.
Search Report-AU-2009202831, dated Jan. 12, 2011.
Search Report-AU-2009202828, dated Jan. 13, 2011.
Petition to Review Denial for Ex Partes Reexamination of U.S. Patent No. 7,568,964 dated Jan. 6, 2011.
USPTO Communication Form for Ex Partes Reexamination of U.S. Patent No. 7,568,964 dated Nov. 12, 2010.
Order Denying Ex Partes Reexamination of U.S. Patent No. 7,568,964 dated Dec. 10, 2010.
Amendment and Response to Office action for Inter Partes Reexamination of U.S. Patent No. 7,604,525, dated Oct. 19, 2010.
3rd Party Comments re: Response to Office action for Inter Partes Reexamination of U.S. Patent No. 7,604,525, dated Nov. 2, 2010.
Action Closing Prosecution for Inter Partes Reexamination of U.S. Patent No. 7,604,525, dated Feb. 25, 2010.
Decision Vacating Inter Partes Reexamination of U.S. Patent No. 7,618,303, dated Jun. 30, 2010.
Notice of Termination of Inter Partes Reexamination of U.S. Patent No. 7,618,303, dated Sep. 30, 2010.
Action Closing Prosecution of Inter Partes Reexamination of U.S. Patent No. 7,568,964—dated Sep. 8, 2011.
Action Closing Prosecution of Inter Partes Reexamination of U.S. Patent No. 7,677,948—dated Sep. 14, 2010.
Office action for Inter Partes Reexamination of U.S. Patent No. 7,618,303—dated Dec. 17, 2010.
International Search Report for PCT/CA2004/002206 dated May 2, 2005.
Japanese Patent Office, Decision of Refusal, Japanese Application No. 2006-545875, Dated Feb. 18, 2009.
Microsoft et al; "Microsoft announces launch date for UltraCorps—second premium title for the Internet Gaming Zone Oblivion", M2 presswire, Newswire; Trade, May 28, 1998.
Office action from Reexam Ganz-36219US25 dated Aug. 19, 2010.
Order Granting Request for Inter Partes Reexamination of U.S. Patent No. 7,568,964.
Order Granting Request for Inter Partes Reexamination of U.S. Patent No. 7,604,525.
Order Granting Request for Inter Partes Reexamination of U.S. Patent No. 7,677,948.
Second Request for Reexamination of U.S. Patent No. 7,618,303—with Exhibits B, C, D, E, F, L and M.
Telecomworldwide et al; "Product Sidewire", Newsletter, Oct. 10, 1995, M2 Communications ISSN: 1363-9900.
Action Closing Prosecution of Inter Partes Reexamination of U.S. Patent No. 7,568,964 Date=Sep. 8, 2010.
Action Closing Prosecution of Inter Partes Reexamination of U.S. Patent No. 7,677,948 Date=Sep. 14, 2010.
Request for Reexamination of U.S. Patent No. 7,677,948—with Exhibits B,C,D,E,O,P,Q,R,S,T.
"The Sims Booklet," dated 2000.
"The Sims 10th Anniversary", http://thesims2.ea.com/, dated Feb. 26, 2010.
U.S. Copyright Registrations for The Sims expansion packs.
Prima's Official Strategy Guide—The Sims, dated 2000.
"The Sims", http://en.wikipedia.org/wikii, retrieved Feb. 6, 2010.
Request for Reexamination of U.S. Patent No. 7,618,303—with Exhibits B, C, D, E, M, N, and O.
Request for Reexamination of U.S. Patent No. 7,604,525—with Exhibits H, I, J, K, L, X, and Y.
Neopets—Archeology, retrieved Mar. 25, 2010.
Nothing but Neopets, "Neopian History.", retrieved Mar. 24, 2010.
Request for Reexamination of U.S. Patent No. 7,568,964—with Exhibits B, C, N, O, R, S.
Right of Appeal notice for Inter Partes Reexamination of U.S. Patent No. 7,604,525 dated Nov. 14, 2011.
Examiners Answer for Inter Partes Reexamination of U.S. Patent No. 7,568,964 dated Nov. 15, 2011.
Action Closing Prosecution for Inter Partes Reexamination of U.S. Patent No. 7,618,303 dated Nov. 14, 2011.
Petition for the Director to Review the Denial of Reexamination Request No. 90/011,310, dated Jan. 6, 2011.
Status Inquiry on Petition for the Director to Review the Denial of Reexamination Request No. 90/011,310, dated Jan. 13, 2012.
Denial of Petition for the Director to Review the Denial of Reexamination Request No. 90/011,310, dated Jan. 26, 2012.
Decision on Appeal of Reexamination Request No. 95/001,341, dated Oct. 30, 2012.
Request to Reopen Prosecution of Reexamination Request No. 95/001,341, dated Nov. 30, 2012.
Decision on Appeal of Reexamination Request No. 95/001,343, dated Oct. 30, 2012.
Order Denying Request Reopen of Reexamination Request No. 95/001,345, dated Nov. 7, 2012.
Renewed Request Reopen of Reexamination Request No. 95/001,345, dated Nov. 21, 2012.
Rebuttal Brief of 3rd Party of Reexamination Request No. 95/001,422, dated Sep. 13, 2012.
Rebuttal Brief Entered of Reexamination Request No. 95/001,422, dated Nov. 15, 2012.
Appeal Docketing Notice of Reexamination Request No. 95/001,422, dated Nov. 26, 2012.
Siona LaFrance, "Meet The SIMS", *The Times—Picayune,* Mar. 16, 2000, et E1, E3 and E4.
"Symbolic Avatar Acting in Shared Virtual Environments", www.dfki.de/imedia/workshops/i3-spring99/w4-final/broll.html, (pp. 1-10).
"Microsoft Agent: Software services to enhance the use interface of applications and Web pages", © 1999 Microsoft Corporation, All Rights Reserved; (2 Pages).
"Web Workshop—Microsoft Agent User Interface"; http://msdn.microsoft.com/workshop/imedia/agent/userinterface.asp, Oct. 1998; (pp. 1-6).
"Microsoft Office 2000 Help: Overview of the Office Assistant"; http://support.microsoft.com/support/Office/In-ProdHlp/Office/ofhowOverviewAssistant.asp Jul. 3, 2000; (5 Pages).

"Web Workshop: Designing Characters for Microsoft Agent" http://msdn.microsoft.com/workshop/imedia/agent/deschar.asp; Oct. 1998; (pp. 1-13).
"The Psychology of Avatars and Graphical Space in Multimedia Chat Communities", www.rider.edu/users/suler/psycyber/psyav.html, May 96, revised Jun. 96, Jan. 97, Jul. 97, Feb. 99, Apr. 99 (v.2.7), (pp. 1-31).
"Business Development", The Palace Visual Chat, © Copyright 1999 Communities.com, (8 Pages).
Eric Anschutz, "Our New Fried, Corporate Interest: VRLMSite Magazine", http://www.vrmlsite.com/feb97/a/cgi/spot4.html, (pp. 1-8).
Connie Guglielmo, "Barbie Invites Girls to Dot-Com Party", Inter@active Week, Oct. 2, 2000 (p. 54).
"Life at the Palace: A Cyberpsychology Case Study", http://www.rider.edu/users/suler/psycyber/palacestudy.html, May 1996, (49 Pages).
"3-D Store", OuterWorlds Universe Copyright © 1998-2000 SeeRay Studios, LLC, http://www.outerworlds.com/crown/3d-store.html, (pp. 1-2).
"Have Avatar Will Travel", Oct. 27, 1999, http://web3d.about.com/compute/web3d/library/weekly/aa102799.html, (pp. 1-4).
Margaret Morabito, "Enter The On-Line World of Lucas-film" RUN, Aug. 1986, (pp. 24-28).
"Primagames.com: News: 'M&Ms' Characters to Appear in PC Game", Nov. 22, 1999, http://www.primagames.com/news/article/611, (1 Page).
"What Is Virtual Reality", Oct. 7, 1998, http://www.cse.d-mu.ac.uk/~cph/VR/whatisvr.html, (pp. 1-44).
"3D Avatar Information: Have an avatar you want us to put in an OW world?", http://www.outerworlds.com/crown/avatars.html, OuterWorlds Universe Copyright © 1998-2000 SeeRay Studios, LLC, (pp. 1-2).
"Deanna's World: The Chat Parlor—Chat Online With Your Friends", http://www.dworldonline.com/dworld8.html, © 1999, (pp. 1-9).
"Mr. Clean" Copyright © 2000 Proctor & Gamble, http://www.mrclean.com/home..html, (5 Pages).
Fujitsu, "Habitat v2.1", 1992, (pp. 1-21).
"Club Caribe Guidebook", © 1989 Quantum Computer Services, Inc., © 1989 Lucasfilm Ltd, (10 Pages).
"The Other Worlds: Psychology of Cyberspace—Comparing Online Chat Worlds" http://www.rider.edu./users/suler/psycyber/otherworlds.html May 1997, (pp. 1-11).
"Spotlight: VRMLSite Magazine", http://www.vrmlsite.com/apr97/a.cgi/spot3.html, © 1997 Aereal, Inc., (pp. 1-6).
"Web Workshop—Designing Characters for Microsoft Agent", http://msdn.microsoft.com/workshop/imedia/agent/charactereditor.asp, Oct. 1998, © 2000 Microsoft Corporation, (pp. 1-4).
"Web Workshop—Guidelines for Designing Character Interaction", http://msdn.microsoft.com/workshop/imedia/agent/guidelines.asp, Oct. 1998, (pp. 1-13).
"Psychology of Cyberspace—Games Avatars Play", http://www.rider.edu./users/suler/psycyber/avgames.html, Nov. 1997, (pp. 1-8).
"Call Me Avatar—Sep. 1, 1999", http://web3d.about.com/compute/web3d/library/weekly/aa090199.html, (pp. 1-5).
"Information Resources in Virtual Reality: Technical Report No. B-93-1", http://www.hitl.washington.edu/kb/irvr/orvr.html, Mar. 5, 1996, (pp. 1-24).
"Web Workshop—Using the Microsoft Agent Character Editor", http://msdn.microsoft.com/workshop/imedia/agent/charactereditor,asp. Oct. 1998, (pp. 1-12).

* cited by examiner

GRAPHIC CHATTING WITH ORGANIZATIONAL AVATARS

Matter enclosed in heavy brackets [ ] appears in the original patent but forms no part of this reissue specification; matter printed in italics indicates the additions made by reissue.

*Notice: More than one reissue application has been filed for the reissue of U.S. Pat. No. 6,910,186. The reissue applications are application Ser. No. 11/820,500 (the present application), which is a reissue application of U.S. Pat. No. 6,910,186 and application Ser. Nos. 11/840,939, 11/840,940, 11/840,941, and 11/859,491 all of which are divisional reissues of U.S. Pat. No. 6,910,186.*

CROSS-REFERENCE TO APPENDICES ATTACHED HERETO

Appendices A-C which are a part of the present disclosure, and which are incorporated by reference herein in their entirety, are attached herewith in the form of microfiche consisting of a total of 13 sheets that contain a total of 1,074 frames.

Appendix A contains source code of computer programs and related data of an illustrative embodiment of the present invention, for use in a Personal Computer (such as a PC available from Dell Corporation) running the Microsoft NT Operating System. The software in Appendix A can be compiled with a Visual C++ compiler (version 4.0 or later) available from Microsoft Corporation. Appendix B describes an architecture of the computer programs and data of Appendix A. Appendix C describes a business plan for use of the computer programs and data of Appendix A.

A portion of the disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

BACKGROUND

Use of a computer for communicating online with others has recently become popular with the increased awareness by the public of the Internet and of services provided by commercial service networks. In addition to enabling access to information and exchange of messages, a link to the Internet or to a commercial service network provides an individual with the opportunity to interact with others who are connected to the network. Users of an on-line service may interact through a chat session as described in, for example, U.S. Pat. No. 5,880,731 that is incorporated by reference herein in its entirety. A user typically accesses a chat service website through a personal computer of the type shown in FIG. 1A.

Personal computer 30 includes a processor chassis 32 in which is mounted a floppy disk drive 34, which is suitable for reading and writing data from and to floppy disk (now shown), and a hard drive 36 suitable for nonvolatile storage of data and executable programs. A monitor 38 is included for displaying graphics and text produced when an executable program is being run on the personal computer and for use in connection with the present invention, for displaying a graphic chat session to a user.

Input can be provided to personal computer 30 using either a mouse 40 for manipulating a cursor (not shown) on monitor 38, which is used for selecting menu items and graphic controls displayed on the monitor by pressing an appropriate selection button (not shown) on the mouse, or by input entered by the user on a keyboard 50. Optionally, processor chassis 32 includes a CD-ROM drive 47, which is suitable for reading programs and data from a CD-ROM. To enable personal computer 30 to communicate during an online chat session, an external modem 41 is coupled to a serial port on processor chassis 32. Optionally, a modem may be included internally within processor chassis 32. The modem also connects to a telephone line to convey signals bi-directionally between computer 30 and a server at a remote on-line service (not shown) to which other participants in a chat session are connected in a similar fashion.

FIG. 1B shows an example of a graphic chatroom as it appears on the monitor of a display device, typically a computer 30. One or more participants in a graphic chatroom may assume an animated on-screen personality called "avatar." For example, an avatar 9, which represents the host of the chatroom, welcomes participants with an introductory text message 8. In such a graphic chatroom, avatar 9 is displayed (see act 10) by computer 30 at an initial location on monitor 38 (FIG. 1A), and thereafter computer 30 checks if the mouse has moved (in act 11), and if so, receives (in act 12) the new position, and transfers the new position to other computers (of other participants in the chat session), and displays (in act 13) the avatar in the new location on monitor 38. Thus, a chatroom participant 20 (FIG. 1A) can manipulate its avatar by using the keyboard 50 and mouse 40 of his computer 30. An avatar's response to the input appears to be real-time to a participant 20. Manipulation of an avatar can result in not only moving an avatar from one locale to another on the screen, but also expressing emotions, dancing, sending a text message, or sleeping, among other options.

FIG. 2 shows a block diagram 31 in which components housed within processor chassis 32 (of FIG. 1A) are illustrated. A motherboard (not shown) includes a data bus 33, which provides bi-directional communication between these components and a CPU 53. The components include a display interface 35, which drives monitor 38, providing the video signals necessary to produce a graphic display during the chat session and when running other executable programs running on the personal computer. A hard drive and floppy drive interface 37 provides bi-directional communication between floppy drive 34 and hard drive 36, and data bus 33, enabling data and machine instructions comprising executable programs to be stored and later read into a memory 51. Memory 51 includes both a read only memory (ROM) and random access memory (RAM). The ROM is used for storing a basic input/output operating system used in booting up personal computer 30 and other instructions essential for its operation. Machine instructions comprising executable programs are loaded into the RAM via data bus 33 to control CPU 53.

A serial/mouse port 39 provides an interface for mouse 40 a data bus 33 so that signals indicative of movement of the mouse and actuation of the buttons on the mouse are input to CPU 53. An optional CD-ROM interface 59 couples optional CD-ROM drive 47 to data bus 33 and may comprise a small computer system interface or other appropriate type of interface designed to respond to the signals output from CD-ROM drive. Optionally, a sound card 43 is connected to data bus 33 and its output is coupled to an amplifier and speaker system 52 to provide a sound capability for personal computer 30. Output signals from keyboard 50 are connected to a keyboard interface 45, which conveys the signals from the keyboard to data bus 33. If external modem 41 is not used, an internal modem 54 can be provided, which is coupled directly to data bus 33. Alternatively, external modem 41 can be connected to the data bus through a serial port of personal computer 30. It should be noted that instead of using a conventional modem, other types of digital adapters can be used to couple personal computer 30 to a telephone line.

Client and server software in the Tc1/TK language to implement a graphic chatroom is available from, for example, http://openverse.org/. An example of virtual reality software for use in forming graphic chatrooms is at http://www.cs.ualberta.ca/~graphics/MRToolkit.html that describes a MR (Minimal Reality) Toolkit for the production of virtual reality systems and other forms of three-dimensional user interfaces.

With the increasing use of modems operating at speeds of at least 28.8 Kbps on commercial networks, graphic chat sessions are becoming more practical. As noted above, in a graphic chat session, some or all of the participants are represented by avatars or icons that are grouped in a graphic environment or "world." In addition to a graphic window showing the chat world, the display screen on each participant's computer commonly includes a chat pane and a message entry pane. When another user joins the chat session, the person's identifier, moniker, or name is added to a list. In some chatrooms, a number of different avatars are provided from which a participant may make a selection. Usually, a participant selects an avatar by using the keyboard 50 and/or the mouse 40 on a pop-up window of the sort depicted in FIG. 3A. Sometimes, the participant has the opportunity to customize the avatar selected and alter the appearance of the avatar as used in various gestures or animations that can occur during a chat session. For further details on user selection of avatars, see U.S. Pat. No. 5,880,731 (incorporated by reference above).

Some chatrooms even allow the participants to upload (from outside of the chatroom software) a picture or icon into the chatroom, e.g. if participants see an icon they want to use as an avatar at a website. One example of such a website that has icons available for use as avatars is illustrated in FIG. 3B (see http://members.tripod.com/~mYLaGe/misc2.html). Therefore, pictures that could be used as avatars include M&M® characters 81 and 82 (FIG. 3B). It is also well known to use M&M® characters in PC games, such as "The Lost Formulas" available from Simon & Schuster Interactive.

Also, a user may create their own icon for use as an avatar, e.g. by use of a graphics editor such as Paint Shop Pro available from Jasc Software, Inc. 7905 Fuller Road, Eden Prairie, Minn. Legal protection for such characters is described by, for example, Pierce O'Donnell in the article entitled "What You Need To Know About Character Protection—Has James Bond Made the World Safe For You?" available through the Internet at http://www.legalelite.com/articles/(a)podonnell01.htm.

During a graphic chat session, comments that have been transmitted by those participating in the chat session appear in a text pane or a speech balloon next to the user's avatar, and any message being entered by the user appears in another pane on the user's computer display screen. Avatars can move freely throughout sites, express themselves through gestures and body language, as well as interact with the environment by playing games, moving objects, decorating rooms, participating in presentations with other users, and making purchases from interests generated from within the chatroom.

In chat sessions involving a well-known person, hundreds of people may join the session, but only the host and the moderator are active in the chat session. All other participants are simply observers. However, one or more provisions may be made to display previously submitted questions from the observers for the guest. The host controls the chat session. The virtual space in which each chat session occurs is sometimes referred to as a "room" because the participants interactively communicate in the way they would communicate in a real room.

Typically, each participant in a graphic chatroom controls only his/her avatar in the chatroom, and each avatar in the chatroom is controlled by one participant. However, a user may acquire supervisory powers to control images on the displays. U.S. Pat. No. 5,802,296, which is herein incorporated by reference in its entirety, discusses power to summon another user, power to create, modify, or delete objects, and an enhanced power to change locales within the chatroom. In order to control the behaviors of avatars, some chatrooms have "acolytes" that act as a chatroom police. Avatars can page an acolyte if they encounter an offensive behavior. An acolyte can then try to reason with the offender, or mute the offender if he cannot be reasoned with.

An article entitled "The Psychology of Avatars and Graphical Space in Multimedia Chat Communities" by John Suler, Department of Psychology, Rider University available at http://www.rider.edu/users/suler/psycyber/psyav.html#Types discusses various types of avatars, for example "matching" avatars and "clan" avatars. Matching avatars are designed to accompany each other and indicate a connection or a bond between the members represented by the matching avatars. Clan avatars are worn by members of the same social group. Clan avatars tend to share the same basic design with slight variations to differentiate one avatar from another. As such, each user announces his/her allegiance to the clan by adopting its collective visual appearance, while also maintaining some measure of individuality. Clan avatars are found almost exclusively among adolescents for whom belonging to a peer group—and conforming to its standards—is a developmental hallmark. Considerable creativity and technical skills may go into creating matching avatars and clan avatars.

Online communities can be formed using Virtual Reality Markup Language (VRML). Business applications for such communities are described in, for example, "The Business Benefits of Online Communities" by Amy Oringel and Konstantin Guericke, available at http://www.vrmlsite.com/apr97/a.cgi/spot3.html. As stated therein, until recently, multi-user virtual communities were mainly considered a vehicle for gaming and entertainment. Although gaming and entertainment markets will continue to grow, a greater profitability lies in the business applications of virtual communities. Shared virtual environments provide companies with personalized communication channels that can be used for a myriad of purposes, such as reaching the target market or collaborating to develop a successful internal framework. Natural interactions in virtual environments offer a heightened experience to users and a cost-effective model to the hosts.

As noted in the article authored by Amy Oringel and Konstantin Guericke, companies of all sizes can use shared environments over the Internet as open communication channels with their customers. Use of the shared environments benefit the customers by providing them with a way of interacting with the company representatives in a more personalized manner than writing a letter or sending an electronic mail to a faceless employee. Likewise, use of the shared environments benefit the companies by allowing them to reach their target consumers much more easily than with an HTML site. By using the shared environments, companies may receive feedback or offer services. Furthermore, when satisfied customers share their positive experiences with a company and its products, the customers themselves become advocates for the company and its products.

However, the shared environments are often not as effective as a live company representative who can form a more personal bond with a potential customer than an order form. This lack of personal bond prevents shared environments from being as effective of a customer interaction channel as it can be. Customer service, shopping malls, trade shows, and sales showrooms are examples of applications that could significantly benefit from the shared virtual environments if the problem of lack of personal bond can be solved.

SUMMARY

A method and system in accordance with the invention display on a computer or television screen an image that represents a live person communicating with one or more users. Typically, at least a portion of the image is owned by an organization (also called "controlling organization") and the use of the image is approved by the controlling organization. The organization's ownership rights in the image may arise from, for example, copyright law and/or trademark law. The controlling organization may own the copyright to a particular character, for example Superman. Also, the controlling organization may have acquired trademark rights to an image by using the image in commerce. With both copyrights and trademarks, the image may be registered with the government (e.g. with the copyright or trademark office as appropriate).

An image displayed on a computer screen to represent a live person communicating through a computer (or television) with (e.g. send a message to or receive a message from) other persons is hereinafter referred to as an "avatar." As mentioned elsewhere herein, in several embodiments, an organizational avatar is owned by an organization. An organizational avatar is different from another type of avatar (hereinafter referred to as "generic avatar") that merely represents any user in a virtual environment, in that the image of the organizational avatar holds a value or a significance that is independent from its use as an avatar. The present invention, therefore, pertains to a new class of avatars.

A user can interact with an organizational avatar in a number of ways. For example, a user can talk to an organizational avatar at a website or in a graphic chatroom (that may provide, for example, a first person view) without using an avatar to represent himself/herself. Alternatively, a user may use an avatar (in a chatroom that provides, for example, a third person view) to represent himself/herself. Depending on the chatroom, a user's choice of avatars may or may not be limited to generic avatars; in some embodiments, the user may not be permitted to choose an organizational avatar. A user who uses an avatar to represent himself in a chatroom may make his avatar not only express various emotions, but also make it physically interact with another avatar, for example by punching, shoving, or lifting another avatar.

In one embodiment, an organization uses an organizational avatar to officially represent the organization. This embodiment allows an employee of the controlling organization to communicate with customers and potential customers in the manner normally used in a graphic chatroom. Furthermore, this embodiment can be made to allow sales transactions in a conversational manner. For example, McDonalds Corporation may decide to use a RONALD McDONALD® avatar in any of the publicly available graphic chatrooms to promote McDonalds products while interacting with generic avatars.

In another embodiment, an organization may set up a chatroom (also called "organizational chatroom") with a background that is related to (e.g. has the same trade dress as) its product or service, and use an organizational avatar as the host of the organizational chatroom. For example, TriCon Global Restaurants, Inc., which owns Kentucky Fried Chicken®, can set up a chatroom that has the trade dress of a Kentucky Fried Chicken® restaurant. TriCon Global Restaurants, Inc. can hire an employee to use a Colonel Sanders avatar in its organizational chatroom and talk to other users who visit the Kentucky Fried Chicken® chatroom, e.g., answer questions about ingredients and calories in meals served at the restaurant. If the organization is a business, an organizational chatroom may be used as an online shop, and an employee using an organizational avatar may enter into sales contracts with users of generic avatars, e.g. for the organization to sell goods and/or services to the users.

The backgrounds for organizational chatrooms can be designed using tiles, which are picture fragments that can be arranged like pieces of a jigsaw puzzle on a computer or television screen to create a background. A chatroom software that uses tiles for the background has an archive of different types of tiles. Any number of each type of tile can be retrieved from the archive and placed on the desired spot of a computer or television screen to create a background. Use of tiles can reduce the file size for expressing various backgrounds by several times (e.g. can reduce to 1/10) as compared to prior art backgrounds.

In yet another embodiment, a controlling organization permits the use of organizational avatars, such as avatars of M&M® figures or Barbie dolls, to participants other than the controlling organization. For example, all users of a graphic chatroom may be represented by avatars owned by a single organization. An organization may allow users to use the organizational avatars free of charge for the purpose of familiarizing the user(s) with the particular products represented by organizational avatars. By familiarizing the user(s) with the products of the controlling organization, the organization effectively advertises its products. Depending on the business model, free usage of organizational avatars may be allowed indefinitely, may be allowed only prior to the release of a related product, or may be allowed a limited number of times (or over a limited duration).

In another implementation of the above embodiment, a graphic chatroom requires the user to enter a password which the user can only obtain by purchasing a product or service of the organization that operates the chatroom. The chatroom software may, for example, require that the user enter a unique number imprinted on a hidden portion of the packaging of a product. Users that are unable to enter such a password may be limited to using generic avatars (selected from a predetermined list), or may not even be allowed to enter the chatroom. A restriction in the use of organizational avatars that apply only to non-owners of the corresponding products induces those who are familiar with the avatars to purchase the products. Moreover, having a doll on hand in the real world and using the corresponding avatar online provides a child with a novel touch that is not available to prior art users of graphic chatrooms.

Although an organizational avatar may be used in a graphic chatroom, its use is not limited to graphic chatrooms. A controlling organization, such as McDonalds Corporation, may wish to use one of its avatars, for example an avatar of RONALD McDONALD®, in its website. In addition, real-time online communication methods, such as America Online Instant Messenger, may eventually become graphic and implement organizational avatars. Since the image of RONALD McDONALD® is already familiar to many McDonalds® customers, a RONALD McDONALD® avatar can be effectively used as a spokesperson for McDonalds Corporation.

Organizational avatars provide organizations with increased connectivity and interactivity with their customers, thereby providing a cost-effective way of marketing and advertising. For example, whereas employees in McDonalds restaurants only focus on selling the various food items on the menu, a RONALD McDONALD® avatar promotes goodwill and collects data from customers in addition to selling the menu items online. Organizational avatars are especially cost-effective when they reside in the Internet which is accessible worldwide, although organizational avatars as described herein can also be distributed on storage media, such as CD-ROMs. Through organizational avatars, companies can market their product or collect data from all over the world. With online activities becoming more prevalent among children and teens, companies that target younger age groups are especially likely to benefit from organizational avatars.

DETAILED DESCRIPTION

The present invention pertains to a new class of avatars. Unlike the generic prior art avatars that are valuable only because they represent live persons in a shared virtual environment, the new class of avatars ("organizational avatars") in accordance with the present invention holds a value or a significance independent from their use in a virtual environment. Unlike a generic avatar that is normally created by an artist for use by any person in a chatroom, one embodiment of an organizational avatar is in the image of a trademark, such as Mickey Mouse, Colonel Sanders, or Pikachu (a Pokemon character), or a widely recognized symbol, such as Santa Claus. Such organizational avatars represent certain organizations, typically the organizations that own rights to the images of the avatars, in virtual environments. Therefore, users of virtual environments can interface various companies by interacting with those companies' organizational avatars. By using organizational avatars, companies of all sizes can increase their interactivity with customers, advertise cost effectively, and promote a positive image for their products.

Figure 1A:
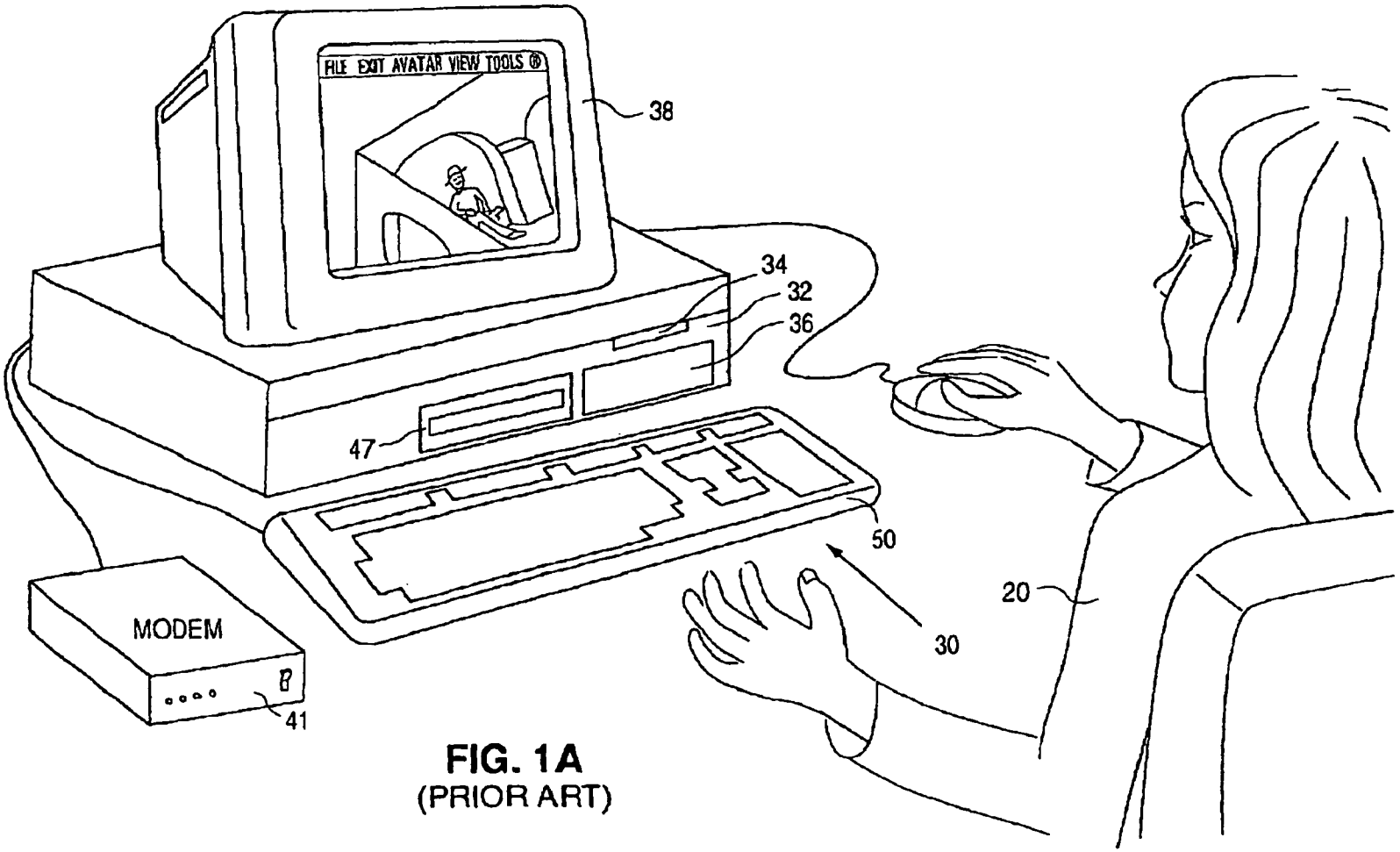
FIG. 1A (PRIOR ART)
FIG. 1A is a three-dimensional perspective view of use of a personal computer and modem by a user of a prior art graphic chatroom.
Figure 1B:
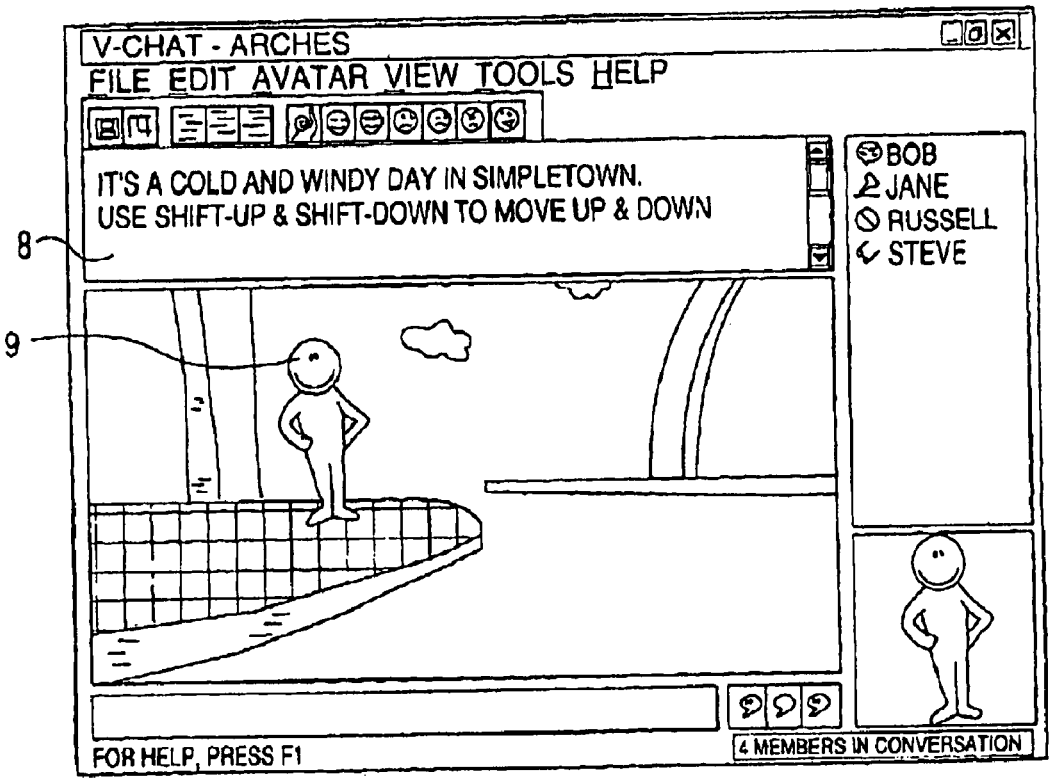
FIG. 1B (PRIOR ART)
FIG. 1B is a front view of monitor 38 of FIG. 1A showing an example of a prior art chatroom with an avatar and a message in a message box.
Figure 1C:
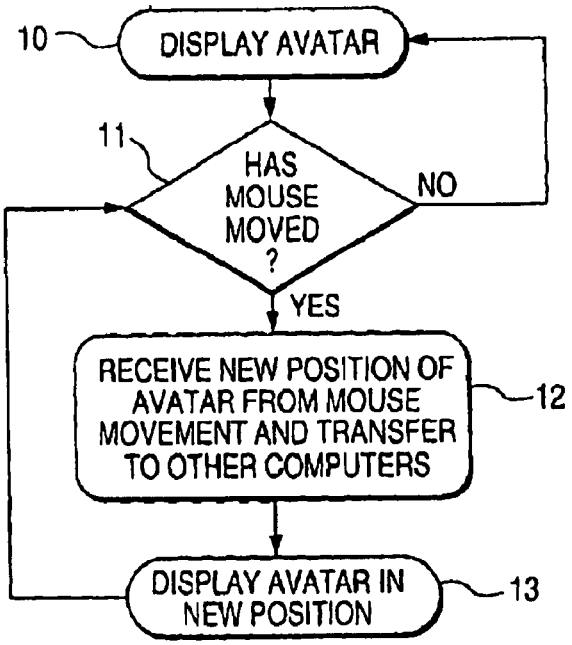
FIG. 1C (PRIOR ART)
FIG. 1C is a flowchart depicting acts performed by computer 30 of FIG. 1A in response to the movement of a mouse.
Figure 2:
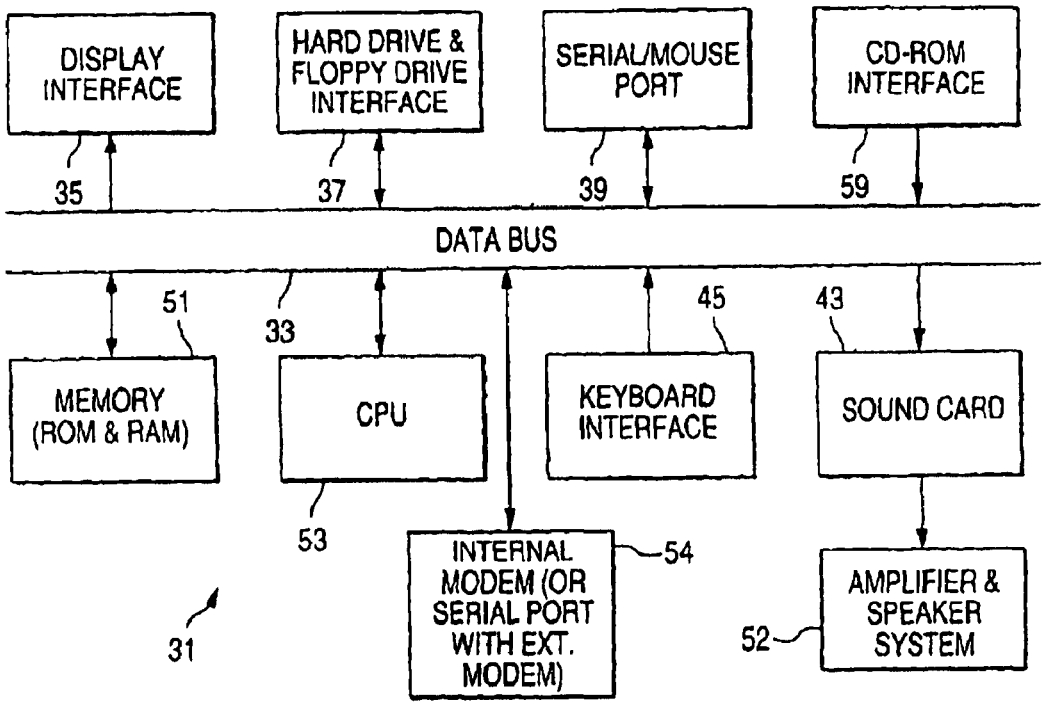
FIG. 2 (PRIOR ART)
FIG. 2 is a schematic block diagram illustrating components in a processor chasis 32 of FIG. 1A.
Figure 5D:
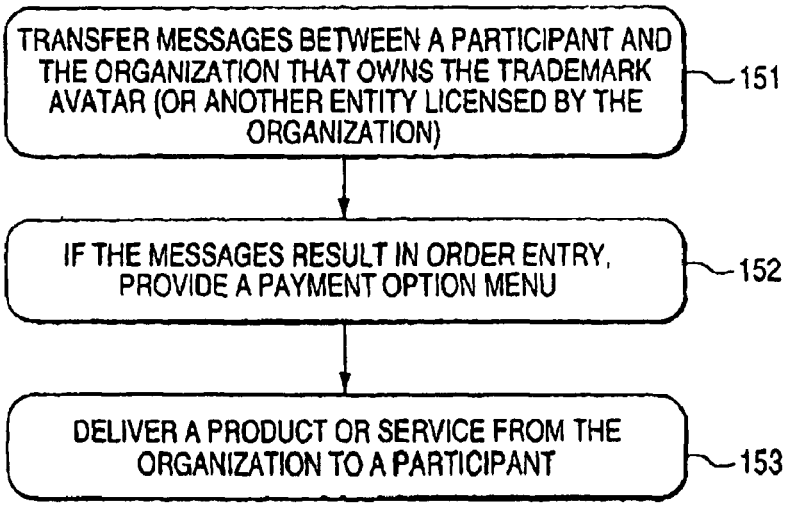
FIG. 5D illustrates, in a flowchart, a process of purchasing a product or service through an organizational avatar.
Figure 3A:
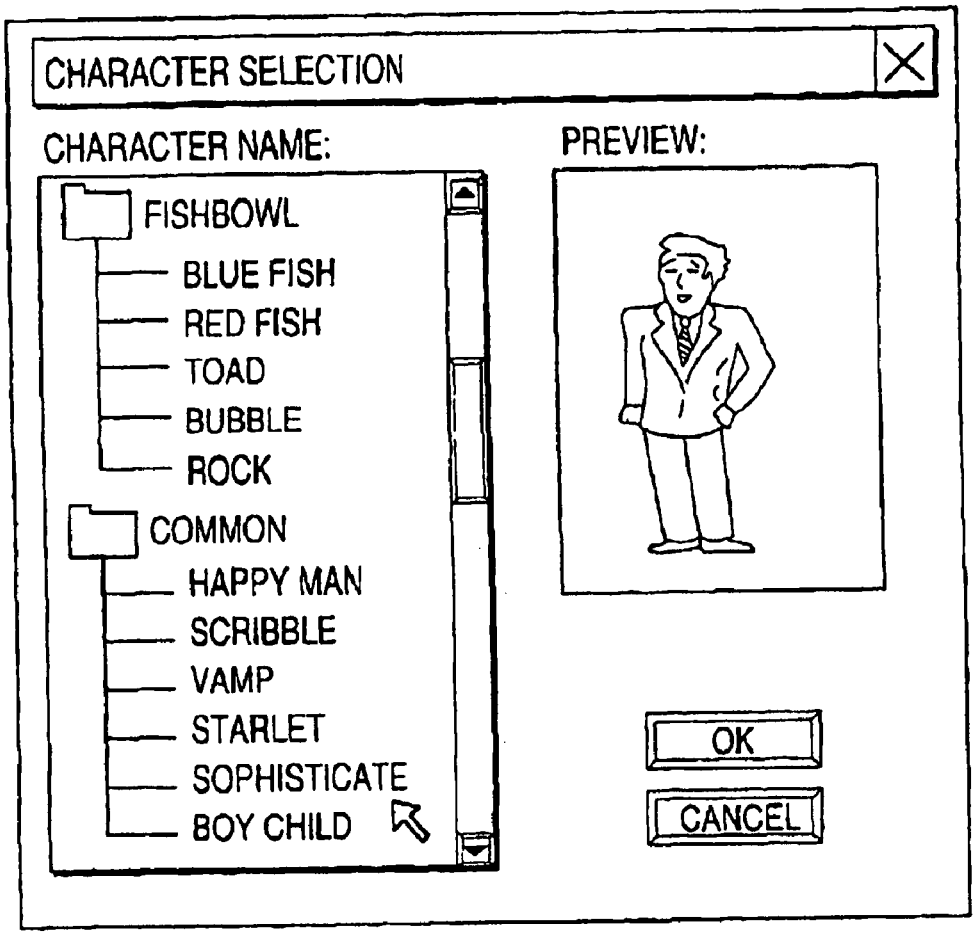
FIG. 3A (PRIOR ART)
FIG. 3A is a character selection dialog box enabling a user to select an avatar in the graphic chatroom illustrated in FIG. 1B.
Figure 3B:
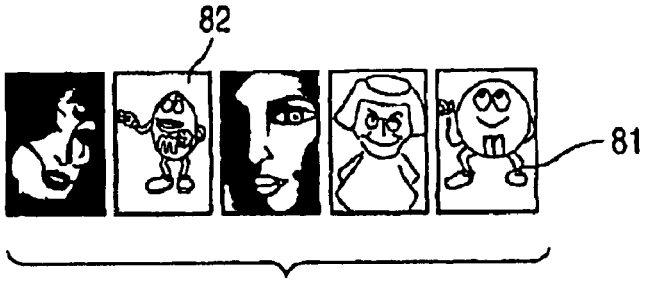
FIG. 3B (PRIOR ART)
FIG. 3B is a set of images available for use in a prior art graphic chatroom.
Figure 4A:
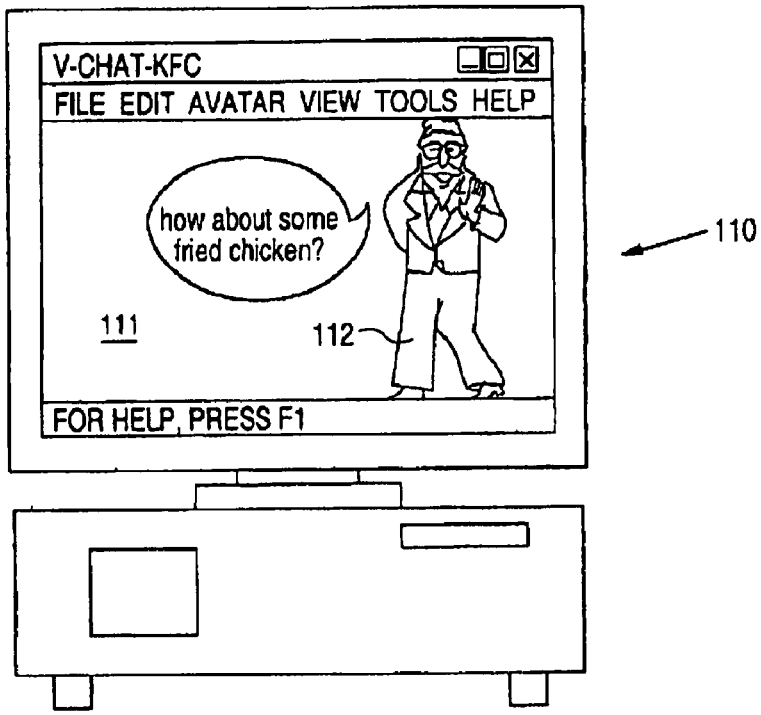
FIG. 4A illustrates a computer showing an organizational avatar in a graphic chatroom in accordance with the invention.
Figure 4B:
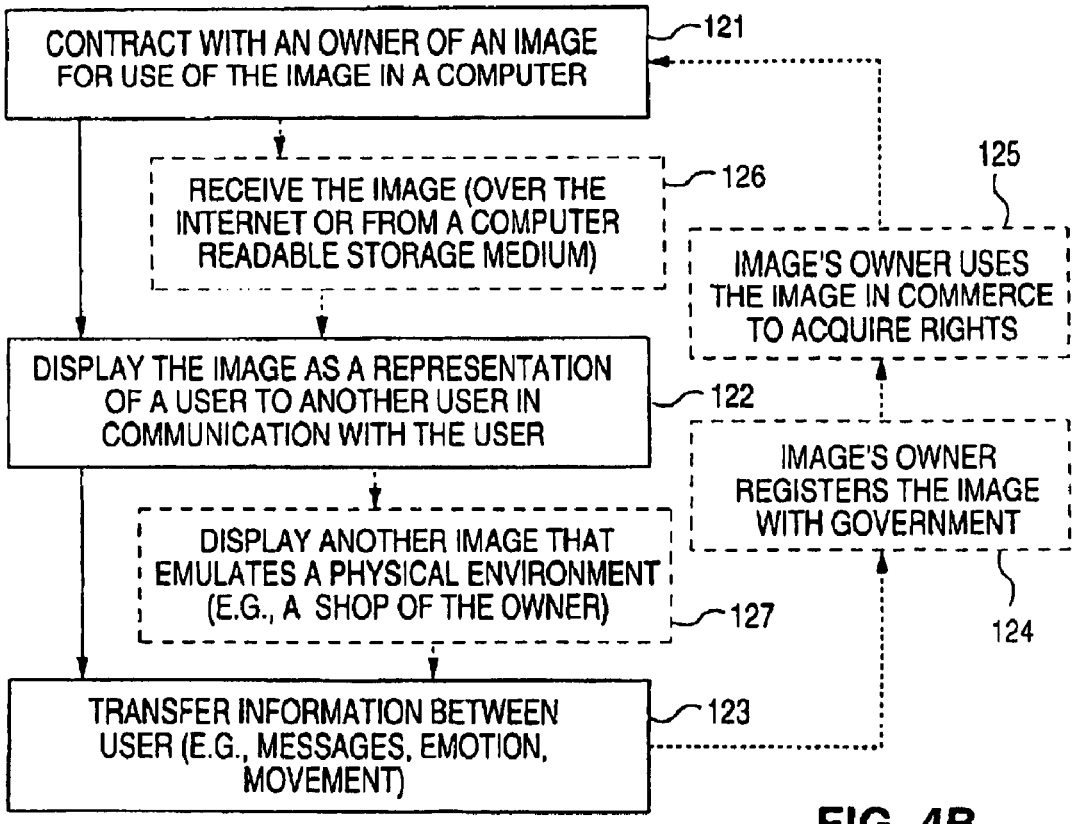
FIG. 4B illustrates, in a flow chart of one embodiment, acts associated with display of the organizational avatar of FIG. 4A.

A method and system in accordance with the invention display (e.g., as illustrated by act 122 of FIG. 4B) on a screen 111 (FIG. 4A) of a computer 110 (that is similar or identical to computer 30 described above, unless noted otherwise) an image 112 that represents a live person transferring information (as illustrated by act 123 of FIG. 4B) to/from one or more users. In one embodiment, the live person enters into a contract with an owner of image 112, for use of image 112. In an example illustrated in FIG. 4A, image 112 is of Colonel Sanders who founded the Kentucky Fried Chicken® business, and who served as its spokesperson when he was alive. The person using image 112 as an avatar (also called "organizational avatar") has a contract (as per act 121 of FIG. 4B) with the Kentucky Fried Chicken® business (e.g. with TriCon Global Restaurants, Inc. which owns the business Kentucky Fried Chicken® In some embodiments, image 112 that is used to form an avatar is of a character that represents one of: a person (e.g. Ronald McDonald), an animal (e.g. Mickey Mouse), or a thing (e.g. a rocking chair). In certain embodiments, image 112 is not limited in any manner, and in fact can be any image whatsoever (e.g. can be real and/or imaginary).

Depending on the embodiment, image 112 may be received (see act 126 of FIG. 4B) by computer 110 either over the Internet (e.g. from a website of the controlling organization that requires the user of computer 110 to enter into the contract, which may be, for example, a click-wrap agreement), or from a computer readable storage medium (e.g. that is packaged in a shrinkwrap that requires the user to enter into a shrink-wrap agreement). Preferably, but not necessarily, computer 110 receives software (such as a chatroom client or a 3D browser) from the controlling organization in the same manner as image 112. Such software may include a feature that prevents use of image 112 outside of the software (e.g. to permit only use of image 112 as authorized by the agreement). For example, the software may be a graphic chatroom software that permits use of image 112 only with a server computer operated by the controlling organization. Alternatively, the software may be in the form of JAVA bytecodes that include image 112, so that image 112 is inaccessible when the software is not being used. As yet another alternative, the image may be made usable only with the software sold or provided by the particular organization that creates and controls certain chatrooms.

An implementation may also be set up so that image 112 is simply located (without any protection, such as encryption) in an appropriate directory in computer 110 that relates to the application software (e.g. C:\ProgramFiles\OpenVerse\) in case of OpenVerse. In such an implementation, misuse of image 112 is not prevented by an engineering mechanism, and instead legal remedies are used to prevent misuse. In one such implementation, the only difference between a prior art system and a system of this invention is the specific use of image 112. As noted elsewhere, use of image 112 may be restricted via software mechanisms, depending on the various embodiments. For example, if image 112 is to be used only by the owner of image 112, then software of the prior art is modified so that (1) the choices of avatars that are available to users is limited to a predetermined list that only allows selection of a generic avatar and (2) the choices of avatars that are available to the owner of image 112 includes at least the image 112. In the latter case, if more than one user choose the same avatar to represent himself/herself with, the software automatically makes adjustments, for example in hair color or the color of the shirt, in order to avoid the presence of identical avatars in a shared environment.

In one embodiment, image 112 is displayed by a browser in the users' computers, and access to image 112 is provided through websites that are trusted by users, such as the organization's website, a virtual mall (that provides access to a number of such chatrooms), or a directory service (such as YAHOO®). Providing access to image 112 from trusted websites provides an assurance to the users (who use such access) that they are dealing with the genuine organization, and not with an unknown entity. Depending on the implementation, digital certificates may be used to improve confidence of such users.

Figure 10A:
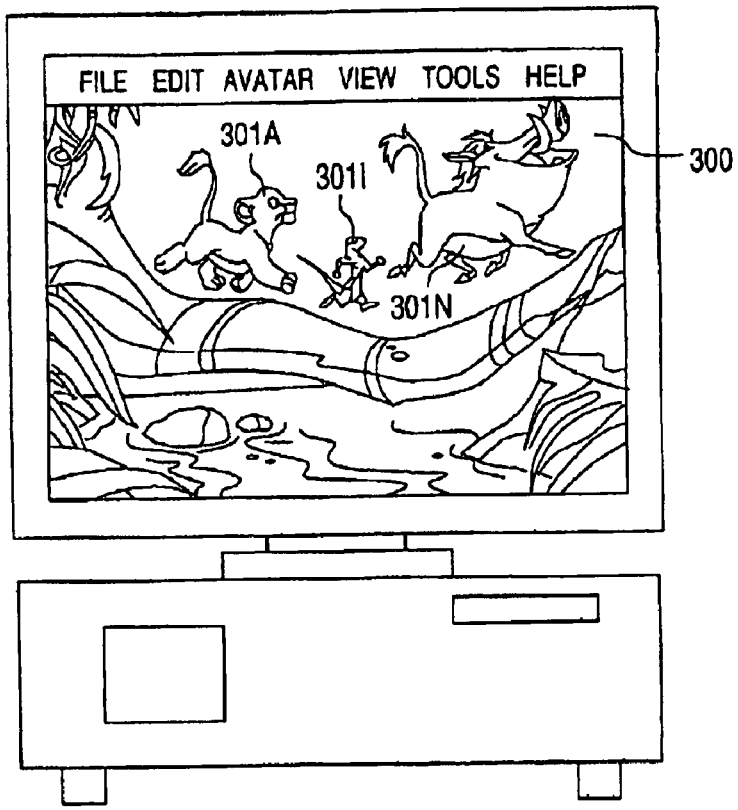
FIG. 10A illustrates a computer screen showing a chatroom wherein each participant in a chat session manipulates a character avatar.

Depending on the embodiment, image 112 may be a line drawing, a picture, or just portions of such a drawing/picture that together form a trade-dress. An organization's ownership rights in such an image 112 may arise from, e.g. copyright law and/or trademark law. Preferably, but not necessarily, the organization (or owner) registers image 112 with the government, e.g. in the copyright office or the trademark office. Registration of image 112, if performed by the controlling organization, can be performed at any time relative to acts 121-123 (described above), depending on the embodiment. Moreover, image 112 need not be registered, and may be a character (such as Superman) that is owned, as per copyright law, by the organization as discussed below in reference to FIG. 10A. Note that such a character need not be owned by the organization in another embodiment, as discussed below in reference to FIG. 11A. In one embodiment, image 112 is used in commerce (as illustrated by act 125 in FIG. 4B) to acquire ownership rights (e.g. as per trademark law), even though not registered.

For example, image 112 may have been used to identify the organization itself (e.g. in an advertisement in the real world, such as a billboard or newspaper advertisement), as in the case of the image of Colonel Sanders that is used with the initials "KFC" to represent the Kentucky Fried Chicken® restaurant. As another example, image 112 may have been used to identify a product (or service) provided by the organization, and to distinguish from the product (or service) from others (e.g. on a store shelf), as in the case of an image of a Coke® bottle (which is a product in the real world) which may be used as an avatar to represent the Coca-Cola Company. Therefore, a trade dress of an organization (which is acquired by use of a packaging or design of a product (or service) either in the real world or in the on-line world to identify source) may also be used to form image 112. Note that for simplicity the examples refer to registered trade marks that are well recognized, although as noted above the trade marks need not be registered.

As yet another example, image 112 may have been used to indicate a source of a product or service even if that source is unknown, as in the case of an image of Mr. Clean (which may be used as an avatar) used to indicate a source of "Mr. Clean Wipes-Ups" Kitchen wipes and Bathroom wipes, although users may not know that Mr. Clean is a mark of Proctor and Gamble. As still another example, image 112 may identify a level of quality of a product or service, e.g. as in the case of "Mr. Clean Wipes-Ups." As yet another example, image 112 may be a symbol that invokes goodwill among the users, again as in the case of Mr. Clean. Another example of image 112 that evokes goodwill is the image of RONALD McDONALD™ (a statue of which is commonly found in McDonald's restaurants), that may be used as described herein to represent on a computer screen a real live customer service representative of McDonald's Corporation. Therefore, depending on the embodiment, an image that is used to form an organizational avatar as described herein includes but is not limited to an image protected by the Lanham Act (the Trademark Act of 1946), as defined at, for example, 15 U.S.C. § 1127 that is incorporated by reference herein in its entirety.

This invention does not cover use of an image 112 as an avatar by a person not authorized by the controlling organization, if image 112 is owned by the controlling organization. Instead, the controlling organization has a contract with the person (that is being represented by the avatar), who may be, for example, (1) an employee (or contractor) that represents the organization to the user or (2) another user, e.g. of software provided by the organization to advertise products or services to such users. Use of such an image 112 by an unauthorized person may be prosecuted by the controlling organization under other legal theories, such as trade mark, trade dress, right of publicity and unfair competition (e.g. misrepresentation) laws.

In one embodiment, an organization uses an organizational avatar to officially represent the organization, e.g. in a graphic chatroom accessed from the organization's website. Software for such a graphic chatroom may be automatically downloaded into computer 110 (FIG. 4A) in the form of JAVA bytecodes, as soon as a user indicates an interest in interacting with a live person when visiting the organization's website. Alternatively, the organization's chatroom may be a portion of a virtual mall, and software for the virtual mall may be already loaded in computer 110.

Figure 4C:
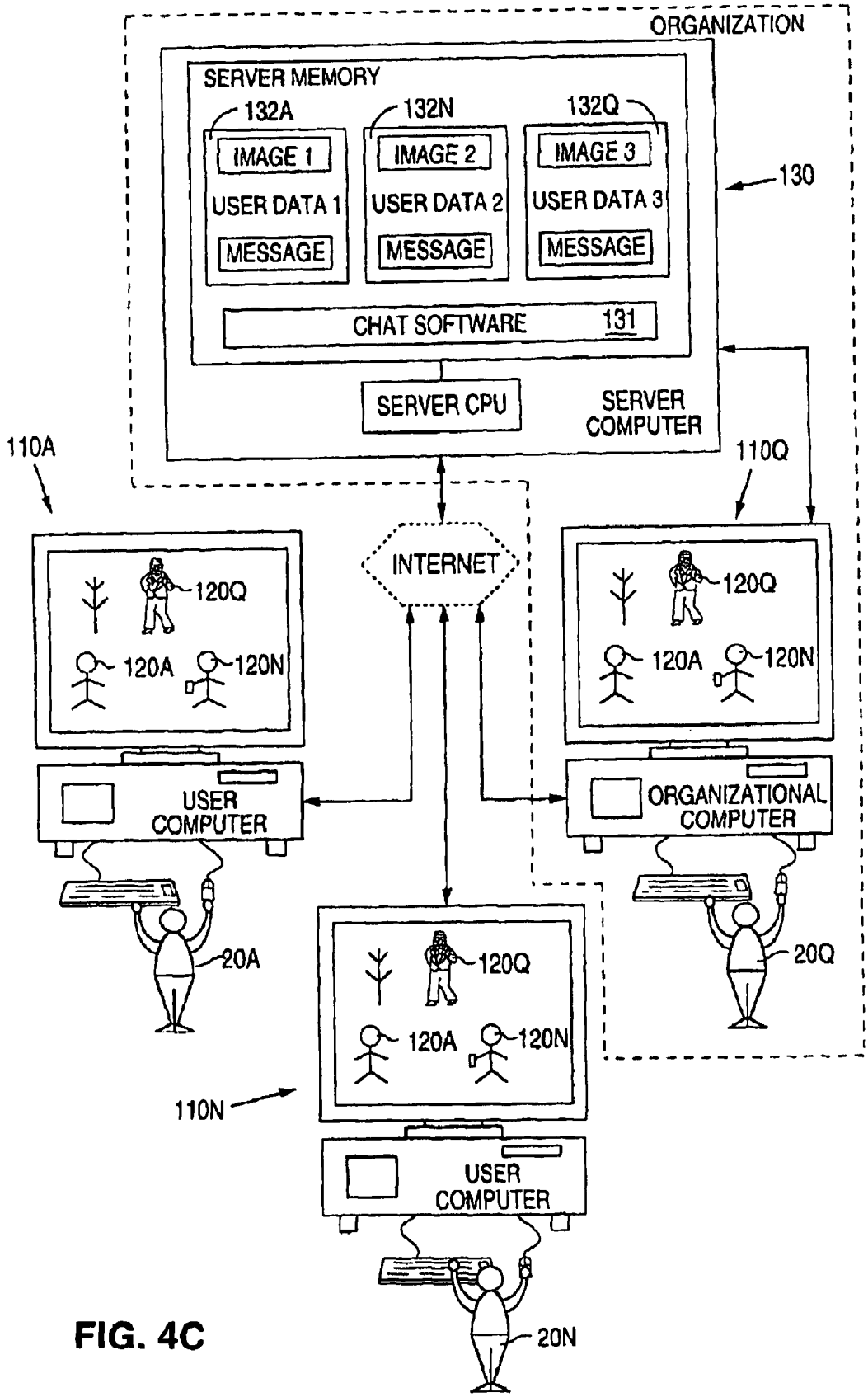
FIG. 4C illustrates, in a schematic block diagram the computer of FIG. 4A interconnected by the Internet to a server computer, and to other computers.

Such graphic chatroom software causes a number of computers 110A-110N (wherein A≦I≦N. N being the total number of users) to have an identical display on their respective monitors as illustrated in FIG. 4C. Each of the corresponding users 20A-20N that operate the respective computers 110A-110N is represented in the display by a corresponding avatar 120A-120N. Avatars (also called "generic avatars") 120A-120N may be formed by images that are not identified with any specific organization, product or service as per trademark law, and that are not characters of the type protected as per copyright law (e.g. not owned by an organization other than the controlling organization). For example, avatars 120A-120N may be formed as stick figures as illustrated in FIG. 4C.

In addition to generic avatars 120A-120N, the display includes at least one organizational avatar 120Q that represents another user 20Q who is a spokesperson for the controlling organization. Therefore, in this embodiment there are two classes of avatars: organizational avatars used by organizations, and generic avatars used by users. So, an employee of a business, and customers (or potential customers) communicate with one another (send and receive messages) in the manner normally used in a graphic chatroom, and transact business in a conversational manner.

Use of organizational avatar 120Q to conduct business allows an organization's employee to 20Q evoke good will of users 20A-20N for the organization, as compared to use of a generic avatar 120I that does not evoke such feeling. Moreover, unlike the real world, user 20Q's physical characteristics (such as race, gender, clothing, and physical handicap) are hidden from users 20A-20N, thereby to provide a more uniform experience to users 20A-20N, regardless of which employee of the organization is acting as user 20Q. Also, use of a graphic chatroom to conduct business provides customers with a real-world feel, e.g. because customers can discuss their common problems amongst themselves. Therefore, use of an organizational avatar 20Q in a graphic chat room as described herein provides advantages' of both, the real world and the on-line world.

Figure 4D:
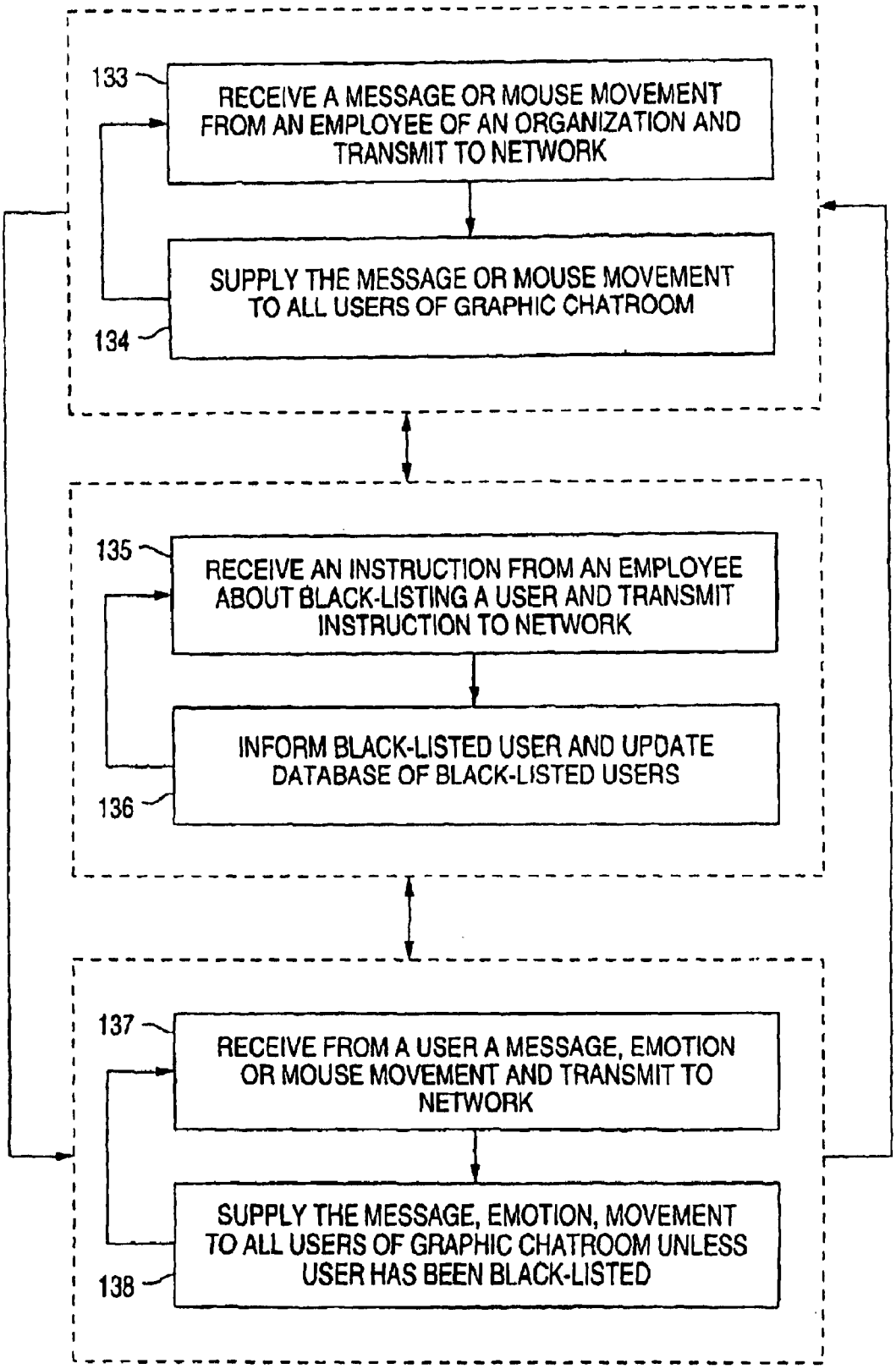
FIG. 4D illustrates, in a flowchart, a process of transferring messages and mouse movements among chatroom participants via the server computer of FIG. 4C.
Figure 4E:
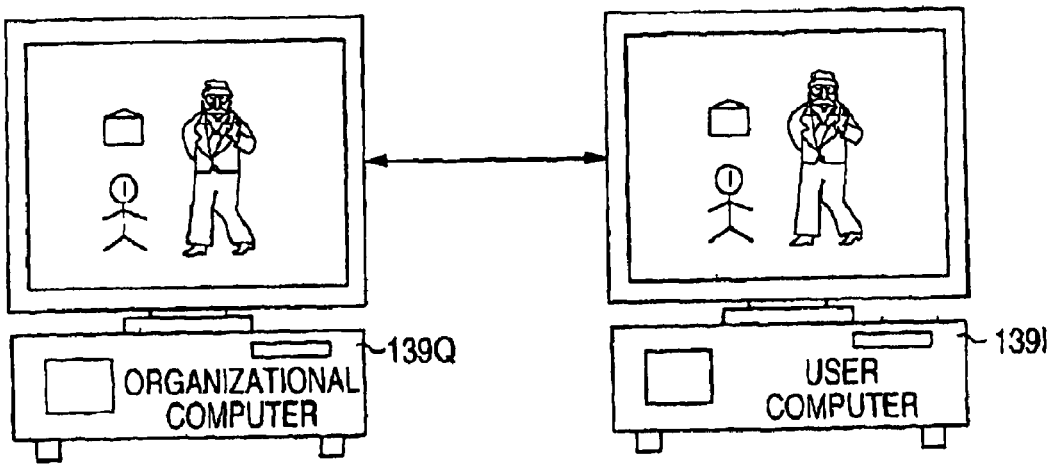
FIG. 4E illustrates chat session participants engaged in a chat session without involving the server computer of FIG. 4C.

In the embodiment illustrated in FIG. 4C, a server computer 130 is programmed with chat software 131 to assist in transfer of information (as illustrated by act 123 of FIG. 4B) among computers 120A-120N and a computer 120Q that is operated by user 20Q. In an alternative embodiment illustrated in FIG. 4E, such a server computer is not used and instead, an organizational computer 139Q communicates directly with user computer 1391 (note that there may be any number of such user computers). Such direct communication (without server computer 130) may take place via the Internet, or may also be via dial-up into computer 139Q.

Server computer 130 (FIG. 4C) maintains local buffers 132A-132N and 132Q to hold data related to corresponding users 20A-20N and 20Q. During operation, computer 120Q may receive a message or mouse movement (or a clickstream of arrow keys) from user 20Q (as illustrated by act 133 in FIG. 4D) and transmit this information to server computer 130 (FIG. 4C). Server computer 130 in turn saves this information in its memory (e.g., in a memory location specific to user 20Q), and supplies the information (as illustrated by act 134 in FIG. 4D) to all users (e.g. to each of computers 120A-120N that update their respective displays in the normal manner). In one embodiment, a user computer 120Q updates the display locally, so as to make the avatar responses to mouse movements appear more realtime than if the update is performed through a server.

In the embodiment just described, chat software 131 in computer 130 (FIG. 4C) is programmed to permit one or more of users 120A-120N to be "black-listed" by user 120Q. For example, a user 1201 may be black-listed if s/he misbehaves by making obscene comments. Instead of being "black-listed," users may be simply "muted" wherein only messages from such users are blocked. Depending on the embodiment, users that are muted may be allowed to "whisper." Users may be "muted" for reasons other than misbehavior, e.g. if there is insufficient room (i.e. the number N of users exceeds a predetermined maximum that can be serviced by a single employee 20Q, an example of such a maximum is 10). In one embodiment, users have to wait their turn to speak with an organizational avatar, and are automatically "muted" upon entry into the graphic chatroom. Only a user whose turn it is to speak is "un-muted" As in the normal manner, users that are muted and/or black-listed can observe everything in the graphic chat room, but cannot participate in the discussion.

When a user is being black-listed, computer 120Q receives (as illustrated by act 135 in FIG. 4D) from user 20Q an instruction about black-listing of user 20A, and transmits the instruction to computer 130. Computer 130 informs user 20A about being black-listed, and updates a database of black-listed users (e.g. may mark in memory region 132A that user is black-listed). Similar acts are performed to remove a user from the black-list. Users 20A-20N communicate with one another in the normal manner of a graphic chatroom. For example, a computer 12ON receives (see act 137 in FIG. 4D) a message, emotion, mouse movement or other such information from user 20N and transfers this information to server 130. Server 130 checks (see act 138) the database to see if user 20N that generated the information is black-listed, and if not transfers the information to all of computers 120A-120N and computer 120Q.

In one embodiment, computers 130 and 120Q are both owned and operated by the controlling organization. Therefore, the functionality of these two computers can be combined into a single computer to yield the architecture illustrated in FIG. 4D. Alternatively, computer 120Q may be the only computer owned and/or operated by the controlling organization, and server computer 130 may be owned and/or operated by a service provider (in which case the organization need not deal with operation and maintenance of computer 130).

In one implementation of the embodiment just described, an organization operates a chatroom (also called "organizational chatroom") having a background 141 (FIG. 5A) that is related to (e.g. has the same trade dress as or contains a trade mark of) the product or service the organization offers, and an image 142 that has a similar relation (which is used as an organizational avatar). For example, TriCon Global Restaurants, Inc. ("TriCon") may set up a chatroom with a Kentucky Fried Chicken® restaurant in its background and hire an employee to talk to other users by using a Colonel Sanders avatar 142. If an embodiment requires that organizational avatars be used only with the software of a specific chatroom service provider, TriCon may hire the chatroom service provider to create a chatroom with a Kentucky Fried Chicken® restaurant in its background. Optionally, TriCon may have the chatroom service also provide one or more organizational avatars for the chatroom.

Figure 5A:
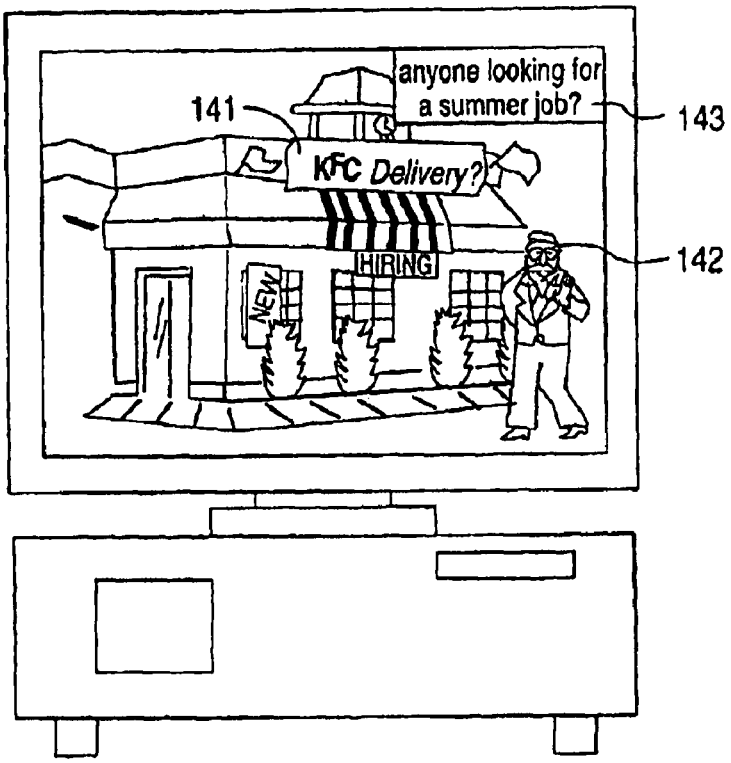
FIG. 5A illustrates a computer screen showing an organizational avatar in a chatroom having in the background a trade dress owned by the owner of the organizational avatar.
Figure 5B:
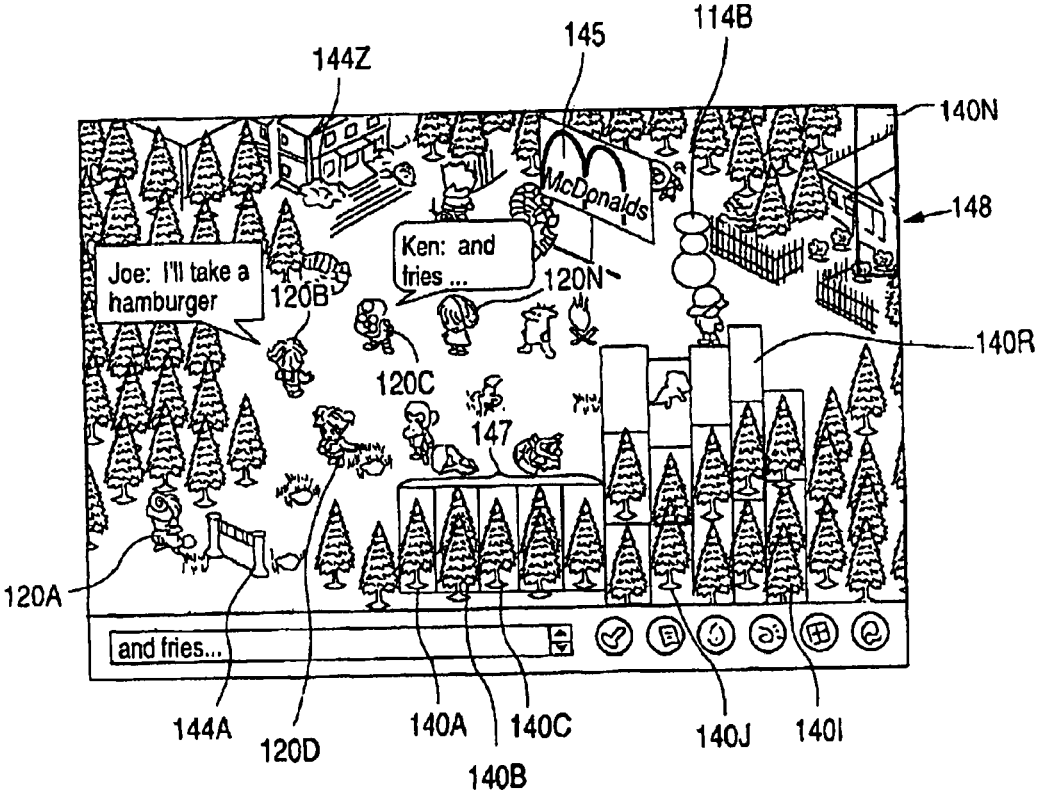
FIG. 5B illustrates a chat session wherein the background comprises tiles.

When setting up a chatroom that can accommodate organizational avatars, the background can be built using a number of tiles 140A-140N (wherein A≦I≦N, N being the total number of tiles) and objects 144A-144Z that are displayed over such tiles, as shown in FIG. 5B. Tiles 140A-140N are graphic segments that can be arranged to depict the desired background. Each tile 140I can be either the same as or different from another tile 140J. Such tiles can be selected to form a background 148 (FIG. 5C) from a list 149 (also in FIG. 5C) that shows tiles of various colors and patterns. Each tile 140I occupies a spot on the computer or television screen, as depicted by the rectangles 146 in FIG. 5C. Like the pieces of a jigsaw puzzle, such tiles in combination with each other, make a complete background. For example, in FIG. 5B, a one-tree tile 140A, two-tree tile 140B are shown arranged alternating with one another to form a row 147 to depict a snow-covered field. Objects 144A-144Z (wherein A≦I≦Z. Z being the total number of objects) such as small landmarks 144A or snowman 144B can be placed on top of the tiles to embellish the background. Various avatars 120A-120R move around on top of such a background.

Figure 5C:
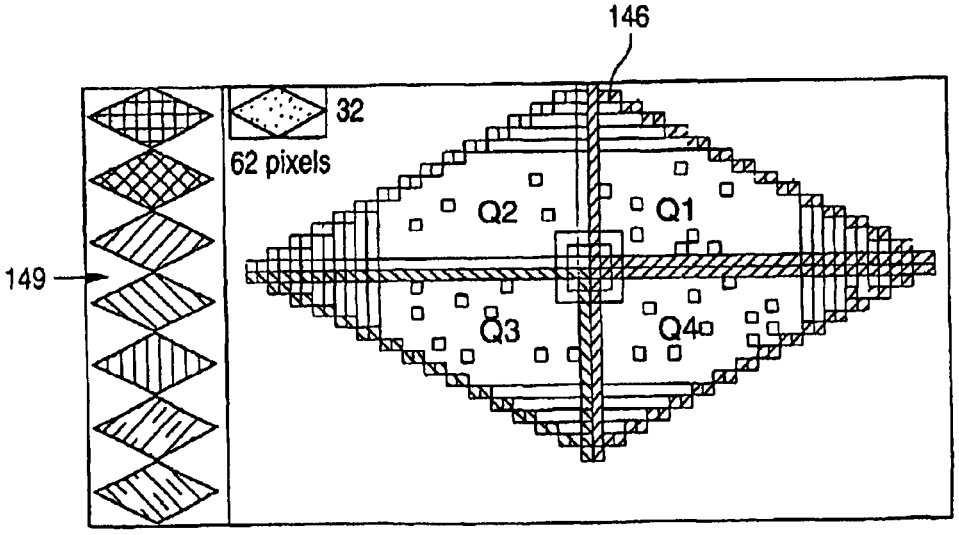
FIG. 5C illustrates different types of tiles and possible arrangements of tiles across the computer or television screen to depict a background.

A tiled background as illustrated in FIG. 5C can be constructed, simply by clicking on a tile in list 149 and then clicking at a location in window 150 where the tile is to be placed. In this manner, an entire background can be quickly and easily constructed by any person, without the need to learn and use a conventional graphics editor. Furthermore, such tiled backgrounds can be downloaded more quickly than a conventional background in the form of an image in a single ".jpg" or ".gif" file. For example, if a single tile were used repeatedly at each of a number of locations of a background, to form the entire background consisting of 100 tiles, the speed to download the single tile is 100 times faster. Although a user computer 139I needs to make 100 copies of the single tile to form the image, with the speed advantage of personal computers (PCs), the incremental time may not even be noticeable by a user. If a number of tiles are used to form a 100 tile background, the speed advantage is proportionately reduced, but is still several times faster than downloading an entire background as a single image.

Tiles 140A-140N and objects 144A-144M is well suited for use with organizational avatars of the type described herein. First, tiles in a background are easy to change without having to redraw the entire background, making them ideal for advertisements that change over time. For example, a tile having the letter "M" to advertise McDonalds can be replaced with another tile having the letters "KFC" to advertise Kentucky Fried Chicken. In a similar manner, if a billboard 145 in FIG. 5B is an object 144, it can simply be replaced with another object. Alternatively, if billboard 145 is formed of a set of individual tiles, that set of tiles (that make up billboard 145) can be replaced with different tiles to change the content of the billboard. Therefore, by simply replacing few tiles of the background, a chatroom service provider can customize the background to accommodate different organizations (e.g. the same background can be used with both KFC and McDonalds, if appropriate tiles are replaced). Also, using tiles dramatically reduces the size of the files needed to create backgrounds because the same tile 140 can be chosen as many times as necessary to create the desired background. The memory space that has been freed by the file size reduction can then be used to store a greater variety of tiles, broadening the tile options for background.

As illustrated by act 151, talking between two or more live persons as described herein takes place by the computer's transferring messages 143. In one embodiment, message 143 is about the organization or its product/service, e.g. solicitation of users to work at the restaurant, or answers to questions about ingredients and calories in meals served at the restaurant, recommendation of certain items on the menu. In another embodiment, message 143 is not about the organization, e.g. may be about current topics in the news (such as the Florida election and changes to the electoral college). Depending on the employee's behavior, Colonel Sanders avatar 142 may even walk with a user (not shown) into restaurant 141, and in response, the background changes to depict the inside, rather than the outside, of a Kentucky Fried Chicken® restaurant.

If the organization is a business, such a chatroom may be used as an on-line shop, and an employee using an organizational avatar may enter into sales contracts with users using generic avatars, e.g. for the organization to sell goods and/or services to the users. In the just-described example, Colonel Sanders avatar 142 may take an order (in act 152 of FIG. 5B) from a user. Optionally, the user may be provided with a menu for selection of a payment method (wherein the user can select, for example, to pay with a credit card number, or choose to pay upon delivery). Alternatively, the default method could be payment on delivery, and the user may be simply informed of this payment method. Thereafter, the ordered item is delivered (as illustrated by act 153) in real life, to the user's address. Depending on the implementation, one or more portions of information about the user that are used to form such a sales contract may be already on file with the organization, in which case the user may simply order selected items from the menu, without being required to provide any further input.

Of course, as would be apparent to the skilled artisan, other businesses may also be operated in this manner. As another example, a sports team may set up a chatroom decorated with the sports team's colors, and use an avatar that resembles the sports team's mascot(s) (such as ACE and DIAMOND in case of Toronto Blue Jays illustrated in FIG. 5E) as host(s) in the chatroom, e.g. to sell sports paraphernalia and tickets for the next game. Thus, instead of physically going to or telephoning a business's office or store, a customer can simply use their personal computer to make a purchase, ask questions, or take care of a problem.

Figure 5E:
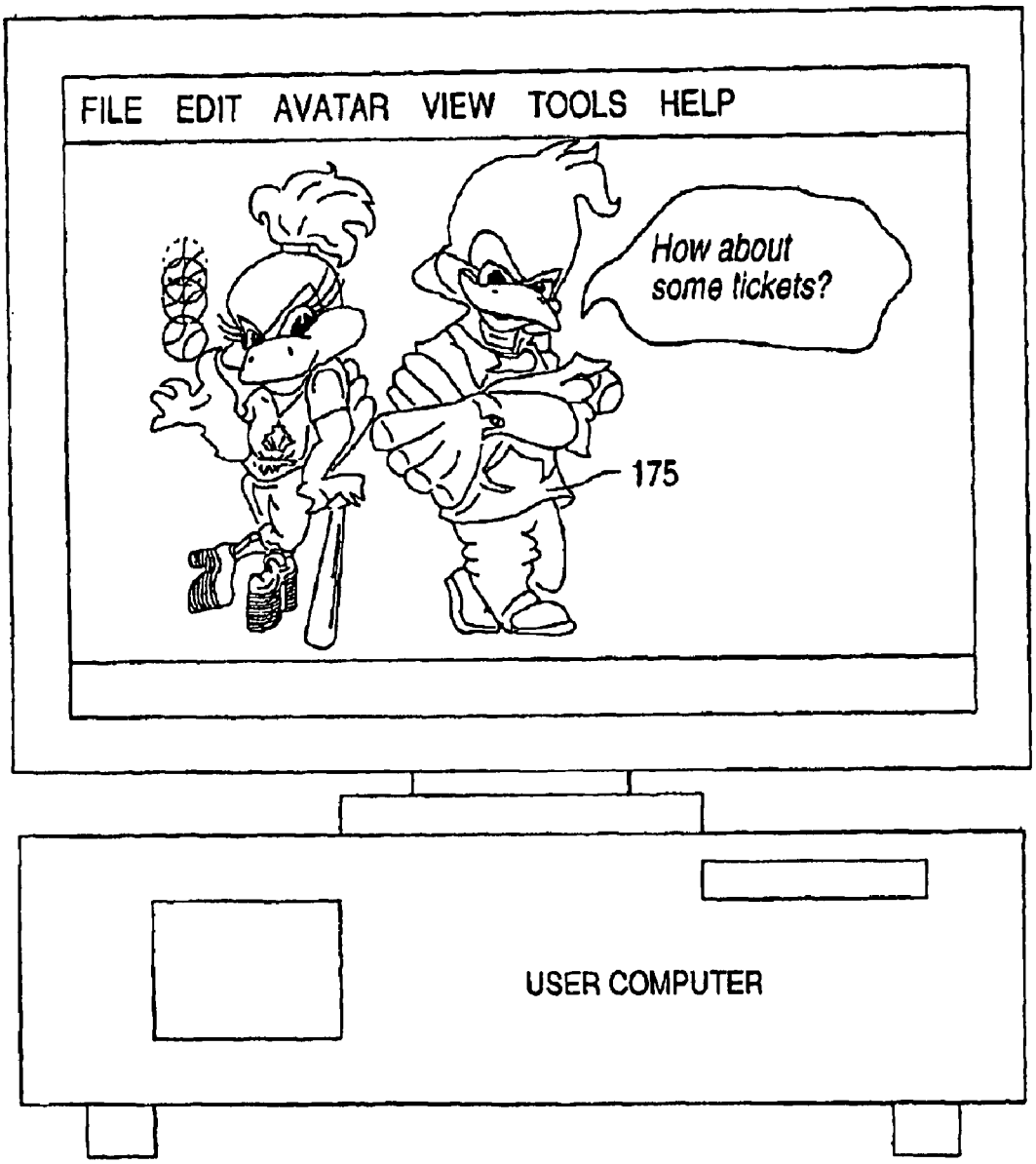
FIG. 5E illustrates a computer screen showing organizational avatars wherein the organizational avatars are sports team mascot(s)

In the examples illustrated in FIGS. 5A and 5E, no generic avatars are shown, because these examples illustrated chatrooms that provide a first person view and the user does not use an avatar. Moreover, in these examples, there are either (1) no other users, or (2) other users are black-listed and not visible, or (3) the software supports only one-on-one communication (between organizational avatar(s) and a single user). However, in a more typical example illustrated in FIG. 6A, the chatroom software provides a third person view, and the user's choice of avatars is limited to generic avatars (such as avatars 161 and 162). As noted above, in this example as well, the user is not permitted to choose organizational avatar 163 which is used only by the organization's spokesperson. Depending on the embodiment, avatars 161-163 (FIG. 6A) may or may not be animated. A generic avatar that is animated allows a user to interact with an organizational avatar not just by text and sound, but also by movement of limbs and/or gestures. Animated avatars can play games using graphic objects, push or punch each other, or make faces at each other, among other activities. A computer can effectively make an avatar appear to move by switching rapidly between different images used to represent the same avatar. For example, an avatar can be made to execute a series of punches by switching rapidly between the two images 168, 169 in FIG. 6B.

Specifically, RONALD McDONALD avatar 163 in a chatroom 164 modeled after a McDonalds(& playroom entertains users, by playing a game with avatars 161 and 162. In this manner, the controlling organization (e.g. McDonald's Corporation) uses its chatroom (FIG. 6A) to improve public relations, to promote a positive attitude toward its products not only in the minds of young participants who play with Ronald McDonald in the chatroom, but also in the minds of those children's parents. The value of organizational avatars as a public relations tool is further enhanced by the fact that the avatars can entertain the chatroom participants in a myriad of ways. An organizational avatar 163 can play games using various objects, sing and dance, participate in a race, or perform a magic show. Therefore, chatroom 164 (FIG. 6A) serves a purpose other than substituting for a physical store (as described above in reference to FIGS. 5A and 5E).

Figure 6A:
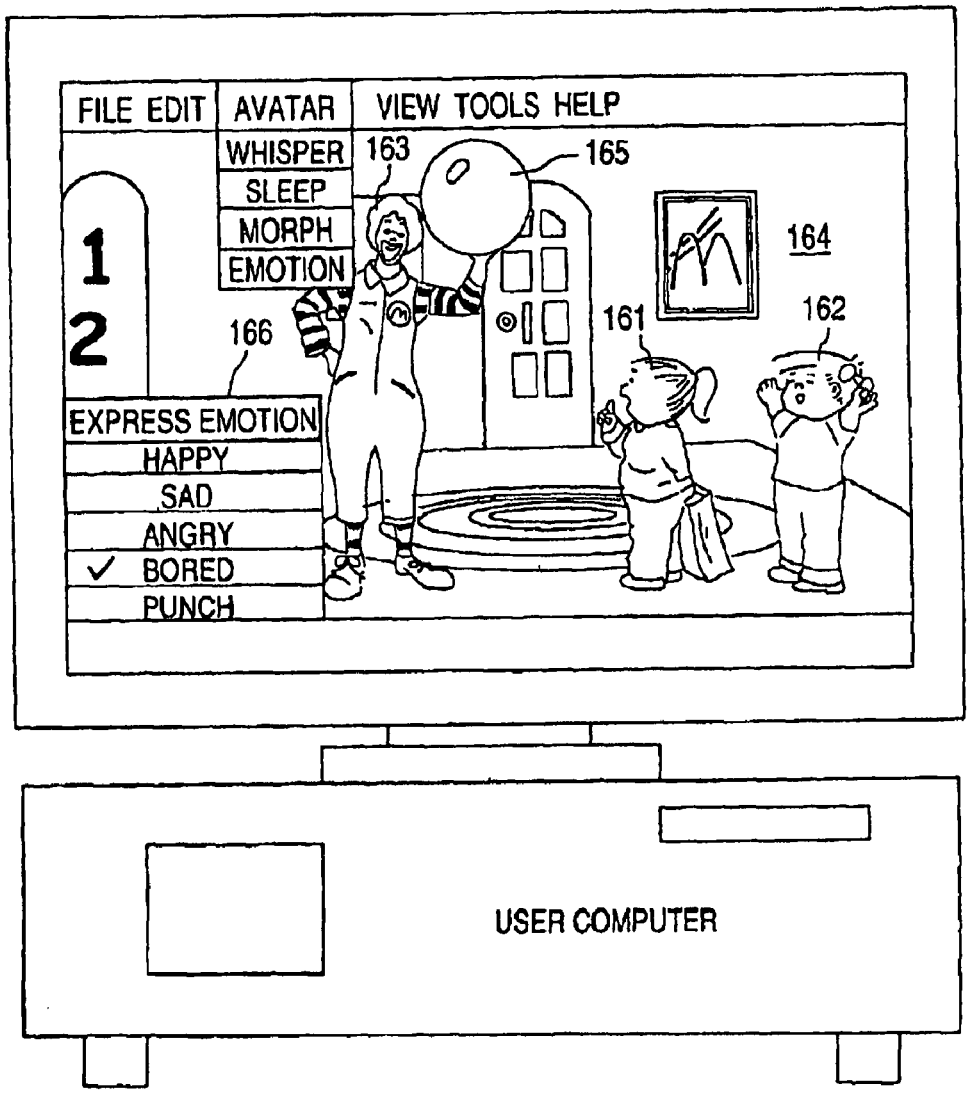
FIG. 6A illustrates a computer screen showing a organizational avatar interacting with generic avatars and using an object in a chatroom.
Figure 6B:
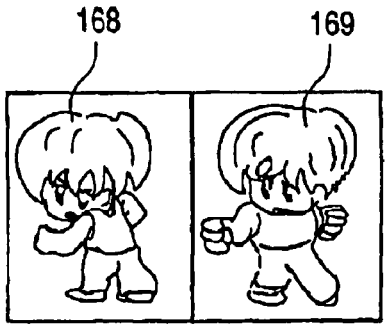
FIG. 6B illustrates an avatar in a punching motion.
Figure 6C:
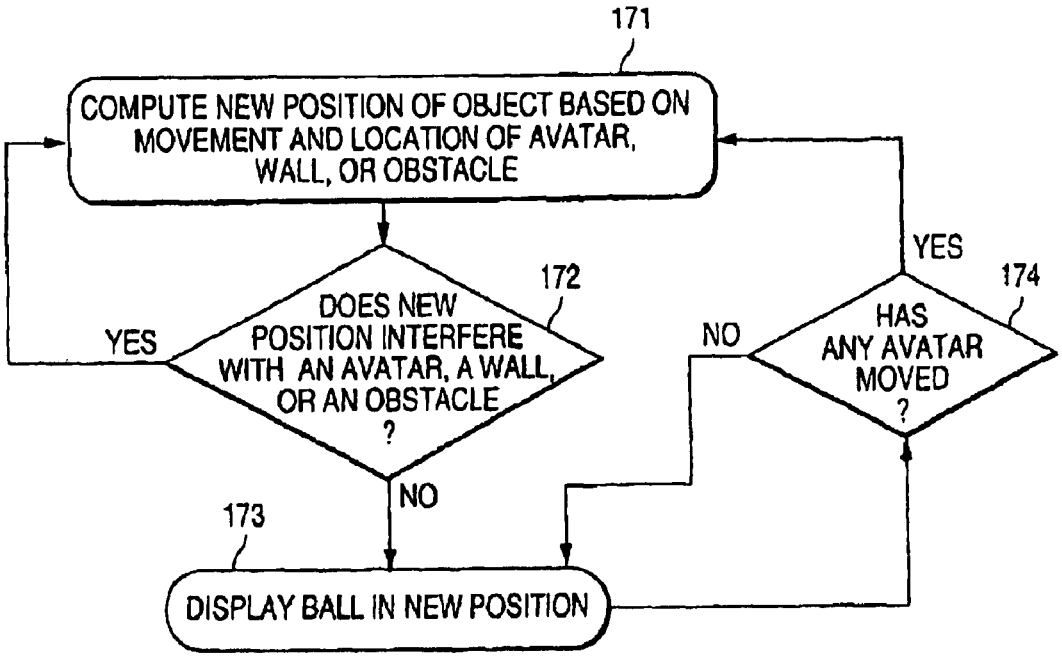
FIG. 6C illustrates, in a flowchart, acts performed by the server computer of FIG. 4C to automatically determine the position of the object of FIG. 6A.

In the example illustrated in FIG. 6A, avatar 163 uses a ball 165 to play a game with avatars 161 and 162. Therefore, a chatroom can be set up to include objects, sounds, or any other embellishment that augment the chatroom's appeal. Ball 165 is automatically controlled by server 130 (FIG. 4C), in response to movements by avatars 161-163. For example, server computer 130 computes (in act 171 of FIG. 6C) the new position of the ball based on the movement and location of an avatar, and based on location of wall or other obstacle in chatroom 164 (FIG. 6A). Next, in act 172, computer 130 checks if the new position interferes with the current position of an avatar, wall or other obstacle, and if so returns to act 171 and if not goes to act 173. In act 173, computer 130 displays the ball at the new position. Thereafter, computer 130 goes to act 174 to check for movement of an avatar, and if so goes to act 171 and otherwise returns to act 173. Note that computer 130 may implement act 174 by simply waiting on avatar movement, instead of actively checking.

In order to express an emotion, a user selects the "Avatar" item in the menu bar (FIG. 6A) to open a drop down list box, and selects the "Emotion" item which opens up another list box 166. Box 166 allows the user to select any of a number of emotions, such as happy, sad, angry, bored, and punch. Avatar 162 is illustrated in FIG. 6A after selection of the "bored" emotion. In one embodiment, the two classes of avatars (organizational and generic) have different behavioral options. A controlling organization may, for instance, limit the ability of ,organizational avatar 163 to express certain emotions (such as anger and sadness), although generic avatars 161 and 162 are permitted the full range of emotions. Limiting organizational avatar 163's behavior options reduces the likelihood of a user 20Q (FIG. 4C) offending customers, and reducing the good will associated with organizational avatar 163. For example, the "punch" option in the menu 166 may be disabled for the organizational avatar 163, but not for other users because punching other user avatars might adversely affect McDonalds' image. Also, as noted above, organizational avatar 163 may have the ability to override the commands of users, e.g. mute problematic users. An organization that is concerned about maintaining order in its chatroom may automatically record all activities in a chatroom, for playback by a supervisor of user 20Q (FIG. 4C) in case of complaints about user 20Q. In addition to emotions, a user may choose to whisper (as discussed elsewhere), sleep or morph.

Figure 7A:
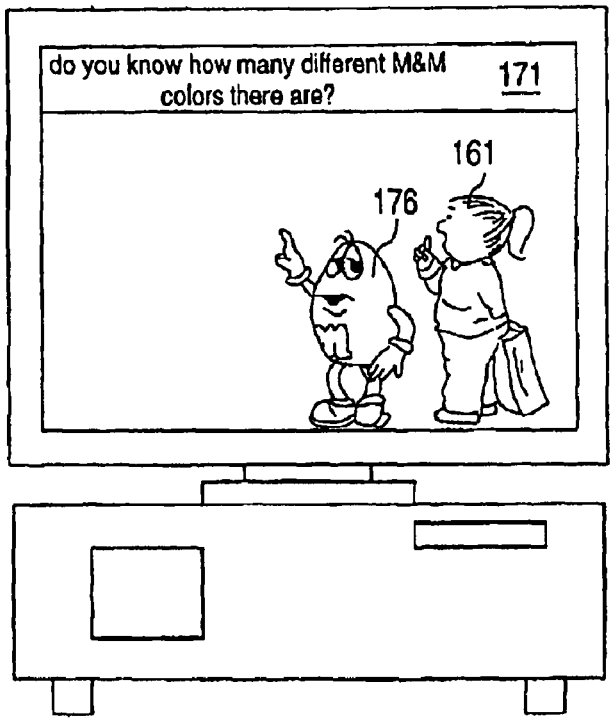
FIGS. 7A and 7C illustrate a computer screen showing an organizational avatar and a generic avatar exchanging messages about the organization, in a chatroom that does not have the organization's trademark or tradedress in the background.
Figure 7B:
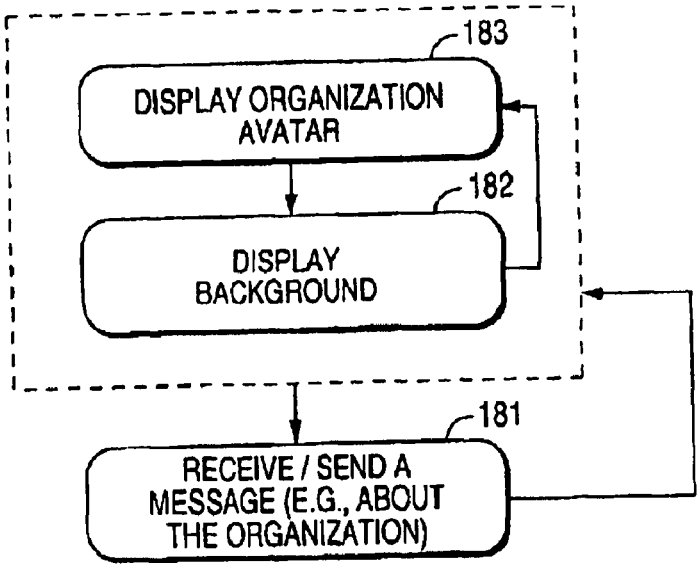
FIG. 7B illustrates, in a flowchart, acts performed to support a chatroom of the type illustrated in FIGS. 7A and 7C.

Although FIGS. 5A and 6A illustrate use of an organizational avatar with a background that is also owned by the controlling organization, other kinds of backgrounds can also be used in a graphic chatroom. For example, FIGS. 5E and 7A illustrate chatrooms that have no background. In each of FIGS. 5E and 7A, the respective messages from organizational avatars 175 and 176 are related to their organization, as illustrated by act 181 in FIG. 7B. Also, as illustrated in FIG. 7A, a text pane 177 may be used to display the message "do you know how many different M&M colors there are" from M&M character 176. Note that avatars 176 and 161 are being used by real live persons to talk to one another in real time. Depending on the embodiment, instead of text messages, voice recordings or even live speech may be exchanged by such users.

Figure 7C:
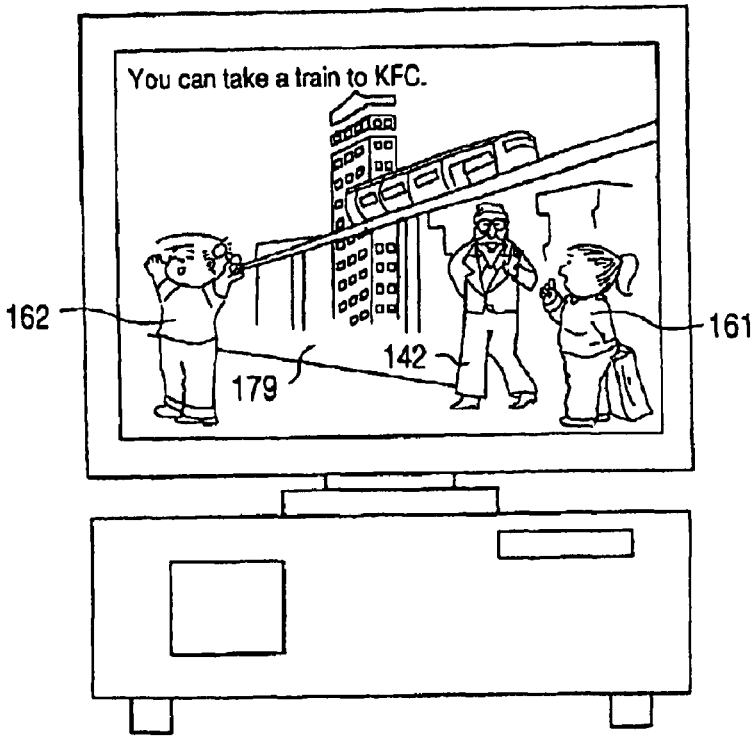

Also, just like any other avatar, an organizational avatar can participate in a chat session that is not hosted by an owner of the organizational avatar (such chat session is hereinafter "generic chat session"). For example, Colonel Sanders avatar 142 can enter a chatroom having a generic background that is unrelated to Kentucky Fried Chicken®, if this generic chatroom is accessible from the Kentucky Fried Chicken®t chatroom of FIG. 5A (e.g. in case of a virtual mall). In the example illustrated in FIG. 7C, server computer 130 displays (see act 182 in FIG. 7B) such an unrelated background, although displaying (see act 183) organizational avatar 142. Generic avatars 161 and 162 may also enter this chatroom (FIG. 7C), if the McDonald's chatroom (FIG. 6A) is also part of the virtual mall. In the example illustrated in FIG. 7C, Colonel Sanders avatar 142 is providing directions to the nearest KFC, although such an organizational avatar may discuss topics that are unrelated to the organization (such as news events, politics, sports, history etc) in the manner of discussions in the real world.

Figure 8A:
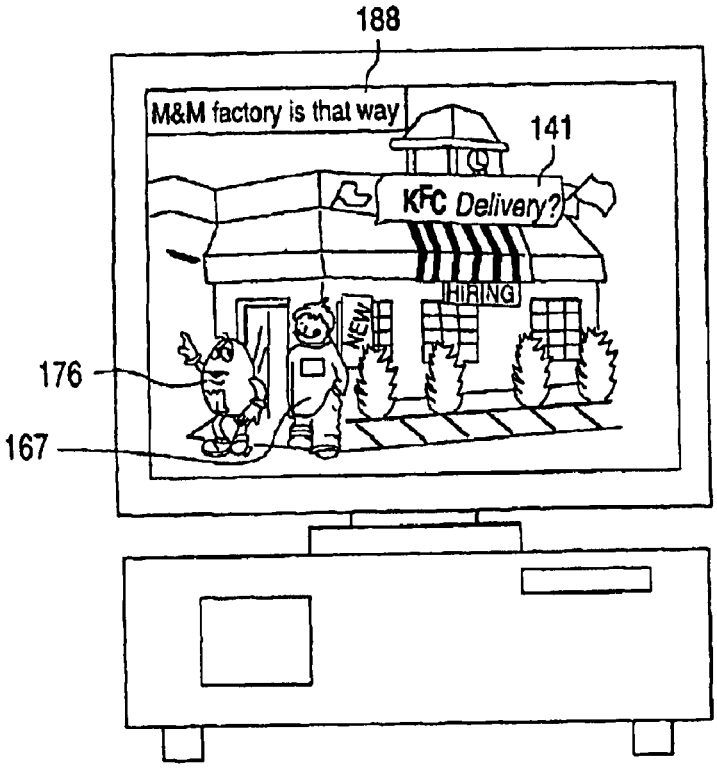
FIG. 8A illustrates a computer screen showing a organizational avatar and a generic avatar in a chatroom that has a trademark in the background, wherein the trademark is not owned by the organization that owns the organizational avatar.
Figure 8B:
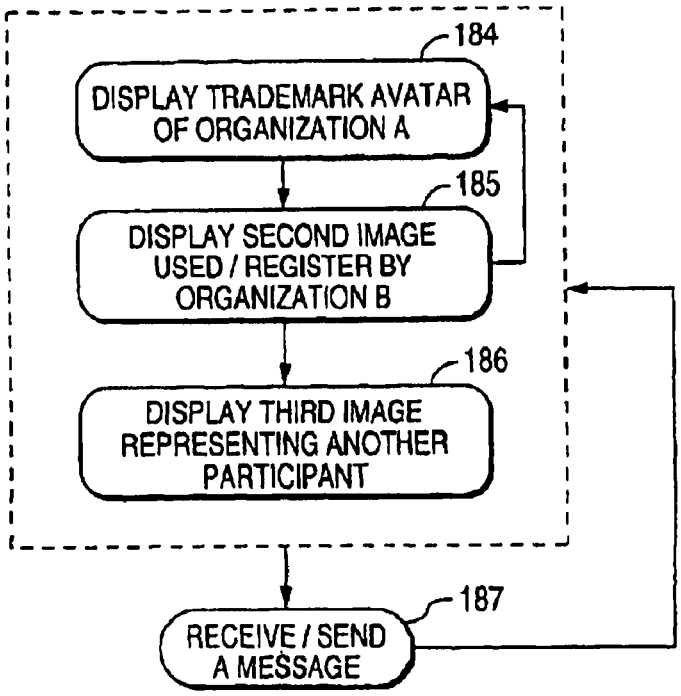
FIG. 8B illustrates, in a flowchart, acts performed to support a chatroom of the type illustrated in FIG. 8A.

Note that a chatroom having a background of one organization can be entered by an organizational avatar of another organization, so that the two organization target the same group of consumers, e.g. in case of a virtual mall of the type described above. Therefore, if M&M's® were targeting the same group of customers as Kentucky Fried Chicken®, an agreement to allow each other's organizational avatars in their respective chatrooms would be an effective marketing strategy. In the example illustrated in FIG. 8A, organizational avatar 176 belonging to M&M® Corporation shows a generic avatar 167, the way to the M&M® chatroom, from the chatroom of Kentucky Fried Chicken®. In such a case, server computer 130 displays the trademark avatar of M&M® corporation (in act 184 of FIG. 8A), background image 141 of Kentucky Fried Chicken® (in act 185), and generic avatar 167 (in act 186). When a user in control of organizational avatar 176 provides a message 188 (FIG. 8B), server computer 130 receives the message and transmits the message to the user in control of generic avatar 167.

Figure 8C:
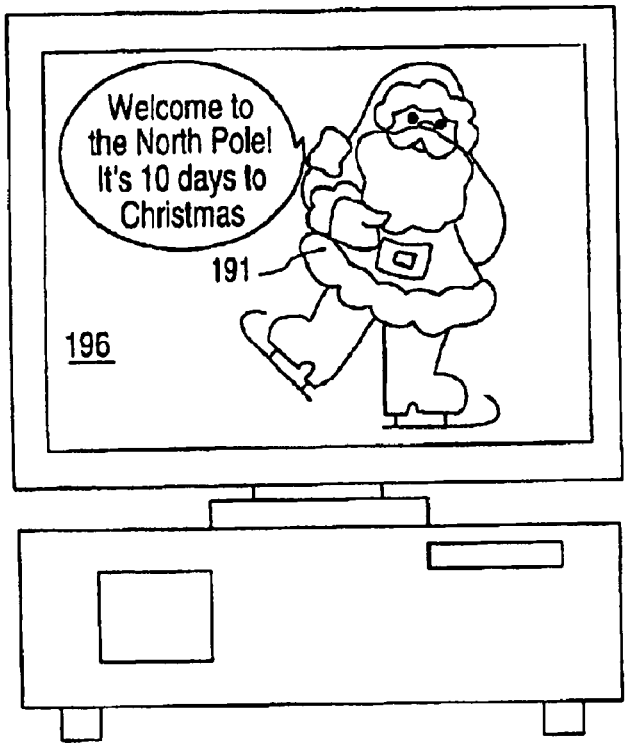
FIG. 8C illustrates a computer screen showing an on-line shop wherein an employee of the shop manipulates a character avatar.
Figure 8D:
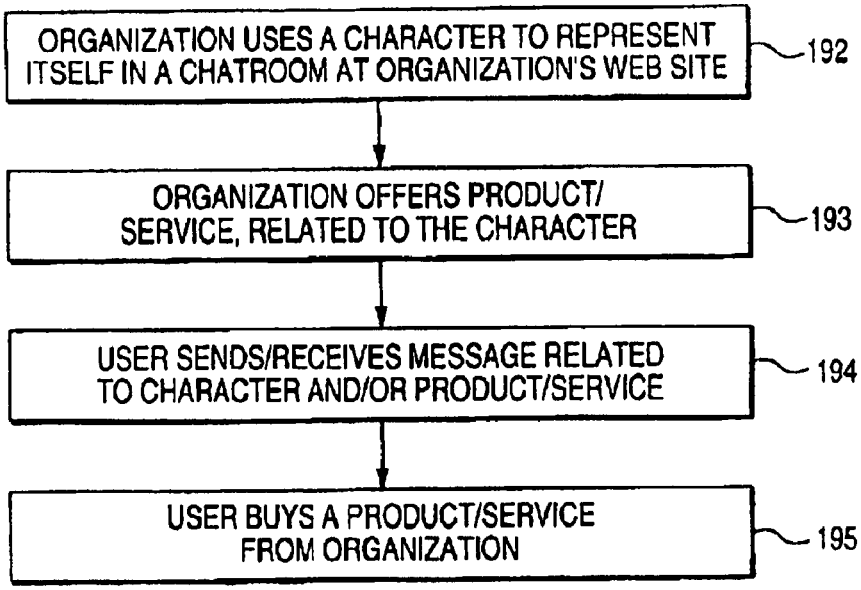
FIG. 8D illustrates, in a flowchart, acts performed to support a display of the type illustrated in FIG. 8C.

In another embodiment, an organization uses (see act 192 in FIG. 8D) a character from the public domain to form an avatar. FIG. 8C, for example, shows a Santa Claus avatar 191 in an organizational chatroom 196 accessible through the organization's website. An employee of an organization, for example a Christmas store, uses avatar 191 to speak about Santa Claus, about being at the North Pole, and that it's only 10 days to Christmas. Additionally, the avatar 191 may talk about products/services of the Christmas store to visitors of the website (see act 193 in FIG. 8D). Depending on the implementation, the products and/or services may be related to the character (e.g. Christmas gifts in case of Santa Claus).

Optionally, there may be other avatars in the form of various creatures or objects related to Christmas, such as elves, candy canes, and reindeers. Depending on the implementation, users may or may not be able to use one of those Christmas avatars to interact with the Santa Clause avatar 191. With or without using an avatar, the user sends and/or receives messages that are related to Christmas or to the organization's products/services (see act 194). Finally, the information exchange can result in a sale of product/service by the organization (see act 195).

Such use of a well-known character as an organizational avatar has the advantage of receiving instant goodwill from visitors who may not be knowledgeable about the organization. Furthermore, the organization may promote its organizational avatar in the mind of the user, e.g. by displaying the image of the avatar at points of sale, and by advertisement and publicity. Such activities may cause the image to achieve "secondary meaning" (the public associates the image with the organization), so that over time an organizational avatar formerly from the public domain now becomes a trade mark of the organization.

In an alternative embodiment, all users of a graphic chatroom are represented by a corresponding number of avatars from a single organization, and each user enters into a contract with the organization for use of the corresponding image (that is owned by the organization). Depending on the implementation, such images may have a common theme. In one example illustrated in FIG. 9A, a graphic chatroom 200 entitled "BARBIE" is made available at the website www-.barbie.com, and allows users to appear as any one of a number of organizational avatars 201A-201N that each have the same image as the corresponding BARBIE® dolls, such as dolls named Barbie, Christie, Kira and Teresa.

Figure 9A:
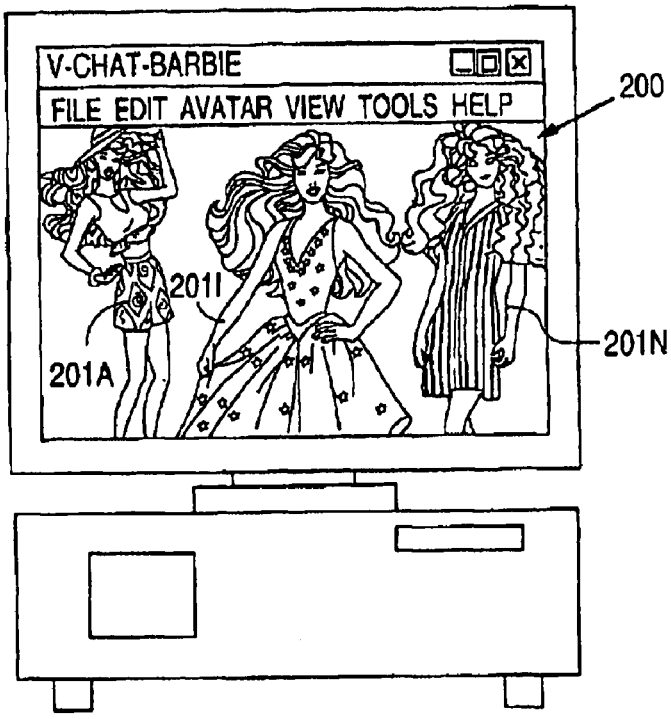
FIG. 9A illustrates a computer screen showing a chatroom wherein each participant in a chat session manipulates an organizational avatar.
Figure 9B:
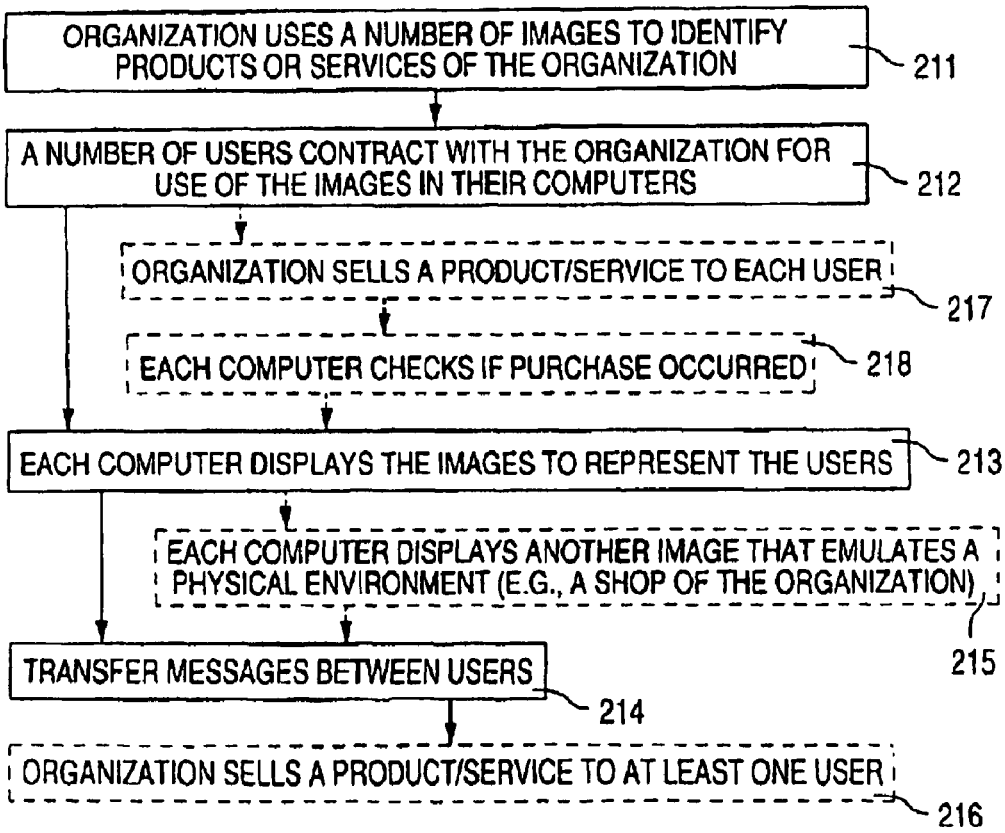
FIG. 9B illustrates, in a flowchart, acts performed to support a chatroom of the type illustrated in FIG. 9A.

In one implementation of the alternative embodiment, an organization uses a number of images (e.g. that are to be used for avatars 201A-201N) to identify products or services of the organization (see act 211 in FIG. 9B). Thereafter, a number of users (e.g. that are represented by avatars 201A-201N) contract (as illustrated by act 212) with the organization to use such images in their computers. Next, each computer displays (see act 213) the images to represent the users, as illustrated in FIG. 9A. Thereafter, server computer 130 programmed with graphic chatroom software 131 transfers (see act 214 in FIG. 9B) messages (and any other information, such as gestures, movement etc) between the users, in the above-described manner, so that children across the world can become friends. The just-described graphic chatroom of the alternative embodiment may be designed with a background appropriate for the corresponding avatars (see act 215 in FIG. 9B), e.g. may contain furniture of a BARBIE® doll house, and may be in pink color.

In one implementation, one or more users are allowed to use such avatars free of charge, so as to familiarize the user(s) with the corresponding products, thereby to serve as an advertisement for the products. Depending on the embodiment, all avatars used in a chatroom may share a common theme, e.g., all of the avatars can be in the image of BARBIE® dolls. In one embodiment, all avatars are owned by the same organization, such as avatars in the image of Mickey Mouse, Lion King, and Snow White, all of which are owned by Disney. In the above-described example, the chatroom software may allow users to use avatars of newly-released or yet-to-be-released BARBIE® dolls, so that users purchase these dolls after using the corresponding avatars (see act 216 of FIG. 9B). Depending on the business model, free usage of organizational avatars may be allowed indefinitely, or may be allowed only prior to release of a related product, or may be allowed a limited number of times (or over a limited duration).

Figure 9C:
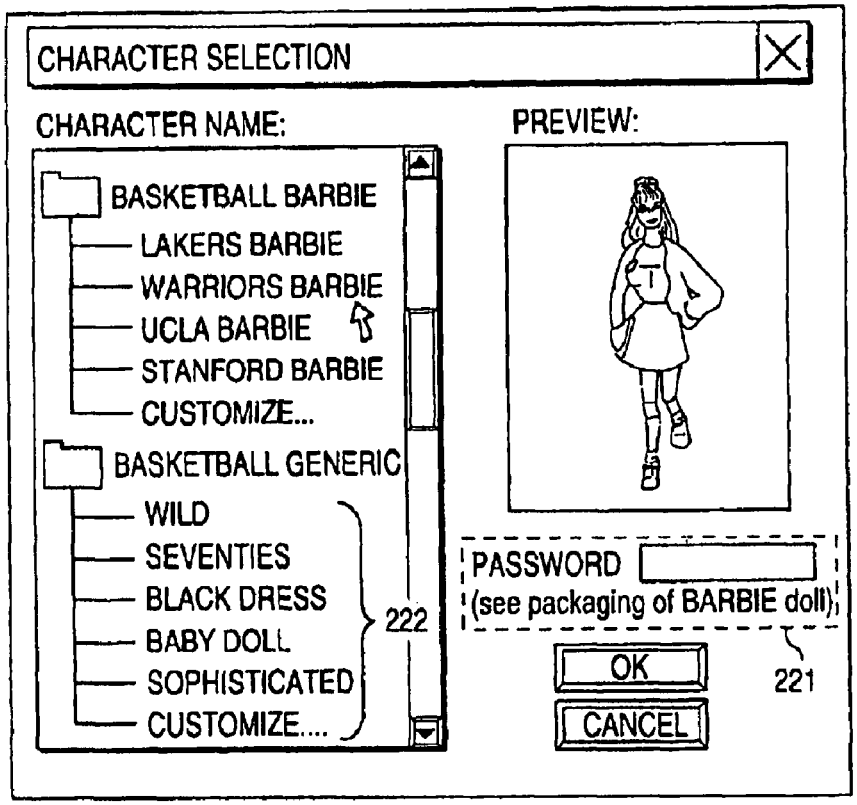
FIG. 9C illustrates a computer screen showing a character selection dialog box enabling a participant to select a BARBIE® avatar.

In another implementation of the alternative embodiment, the user must purchase such a product prior to use of the organizational avatar. For example, the contract described above in reference to act 212 may be formed at the same time that the organization sells a product or service to the user (as illustrated by act 217). Thereafter, each computer checks (see act 218) if a purchase has occurred. For example, in a character selection screen (see FIG. 9C), the user may be required to enter a password in box 221, and the password may be available only on purchase of a BARBIE® doll. Such a password may be imprinted on a hidden portion of the packaging of the BARBIE® doll, so that the user must open the packaging to retrieve the doll and the password.

Figure 9D:
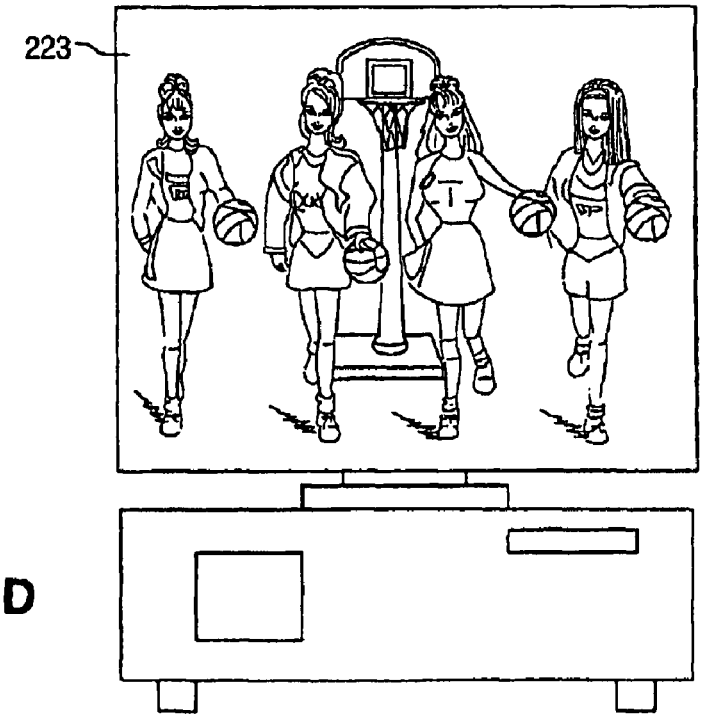
FIG. 9D illustrates a basketball chatroom entered by the participant after selection of an avatar as illustrated in FIG. 9C.

The password may be generic, thereby to allow a user to use any of the various BARBIE® avatars. Alternatively, the password may be specific such that only a purchaser of a specific BARBIE® doll, such as the WARRIORS doll, is able to use the corresponding WARRIORS avatar in the graphic chatroom 223 (FIG. 9D). Users that are unable to enter such a password may be limited to using generic avatars (selected from a predetermined list 222), or may not even be allowed to enter chatroom 223, depending on the implementation. Such restriction in the use of organizational avatars to only owners of the corresponding products induces users to purchase the products. Moreover, having a doll on hand in the real world, while using the corresponding avatar on-line provides a child with a novel touch and feel experience that is not available to prior art users of graphic chatrooms. Furthermore, the organization, Mattel can sell to users other products that are displayed in such a chatroom 223.

Figure 10B:
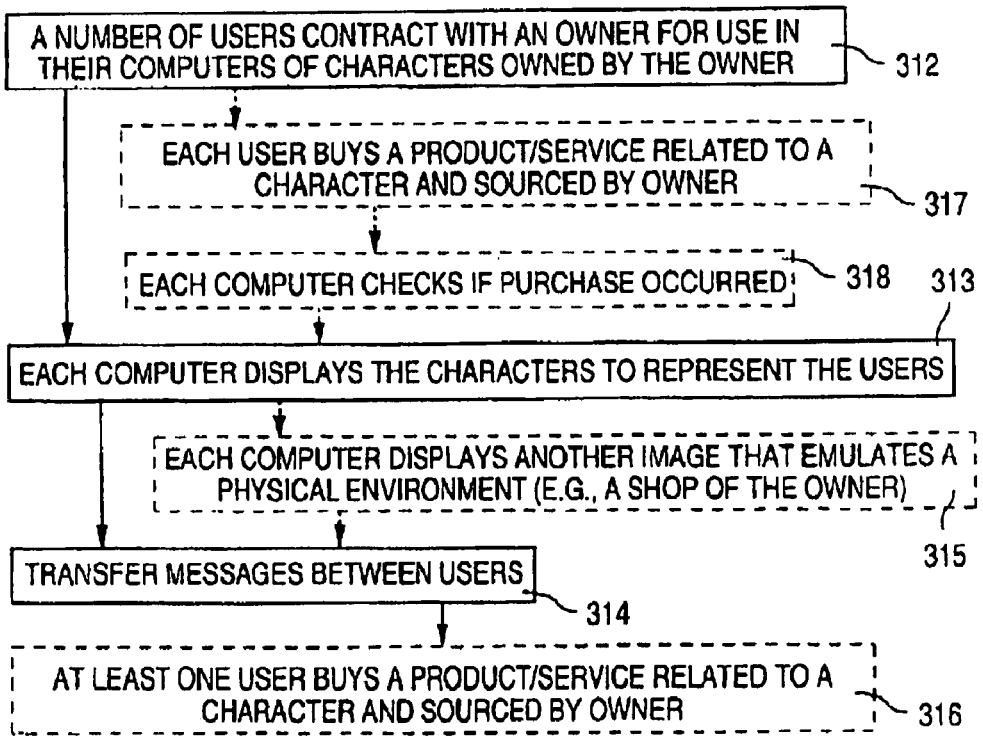
FIG. 10B illustrates, in a flowchart, acts performed to support a chatroom of the type illustrated in FIG. 10A.

In variants of the above-described embodiments, an organizational avatar formed by an image that is a trade mark, trade name, service mark or trade dress of an organization is replaced by another organizational avatar that is formed by an image in which the organization has a copyright. One example illustrated in FIGS. 10A and 10B uses as avatars 301A-301N corresponding characters Simba, Timon and Pumbaa from the DISNEY movie "The Lion King." Unless otherwise noted below, acts 312-318 illustrated in FIG. 10B, for use of avatars 301A-301N are similar or identical to the corresponding acts 212-218 described above in reference to FIG. 9B. Although not illustrated in FIG. 10B, the organization acquires rights to the images (e.g. either from an original author or due to work for hire), prior to act 312. Here as well, the organization may allow use of the characters free of charge, in the hope that at least one of the users buys (see act 316) a product or service related to one of the characters, which product or service is sourced by the organization. Note that the word "sourced" is used to indicate that the organization itself need not sell the product or service, but may license other organizations to perform such sales.

Organizational avatars may also be used with Internet-related applications other than chatrooms and websites. For example, a real-time mode of communication such as America Online Instant Messenger may implement organizational avatars if it develops graphics capability.

Organizational avatars provide organizations with increased connectivity and interactivity with their customers, thereby providing a cost-effective way of marketing and advertising. For example, whereas employees in McDonalds restaurants only focus on selling the various food items on the menu, a RONALD McDONALD® avatar promotes goodwill (e.g., by playing games and giving out coupons) and collects data from customers (e.g., by using an online suggestion box) in addition to selling the menu items online. Advertising with organizational avatars can be enhanced by the use of banners around the border of the chatroom background, or by the use of tile advertisements as part of the background. Organizational avatars are especially cost-effective in that they reside in the Internet, which is accessible worldwide. Through organizational avatars, companies can interface customers from all over the world. With online activities becoming more prevalent among children and teens, companies that target younger age groups are especially likely to benefit from organizational avatars.

Numerous modifications and adaptations of the embodiments and implementations described herein will be apparent to the skilled artisan in view of the disclosure. For example, although in the embodiment described above in reference to FIG. 10A characters of avatars 301A-301N are all from the same copyrighted work (DISNEY movie "The Lion King") characters from different works can be made available in a common chatroom. Examples of other such characters that the same owner Disney could make available include, for example, Mickey Mouse, Minnie Mouse, Goofy, Pluto (Mickey's dog), and Donald Duck. Also, instead of computer 110, a television can be used in other embodiments. Numerous such modifications and adaptations are encompassed by the attached claims.

What is claimed is:

1. A method of communicating between users, the method comprising:

contracting [with], *by* an owner of an image *with a first user and/or a second user,* for use of said image in a graphic environment approved by said owner, said image characterizing a source of a product or service offered by said owner;

*configuring said graphic environment;*

*said configuring allowing a second user to communicate with said first user in said graphic environment;* displaying said image to [a] *the* first user *as an organizational avatar having the same trade dress as said source of said product or service, said organizational avatar representing said source of said product or service, said displaying* to represent a second user communicating with said first user in the graphic environment [that is configured to allow], *wherein said configuring controls* various emotional expressions of said first and second users as well as physical interactions[, if desired,] between a representation of said first user and said [image] *organizational avatar* representing said second user to emulate an actual physical interaction between said first and second users; and transferring a message between said first user and said second user over a network.

[2. The method of claim 1, wherein said image represents a public knowledge about said owner and distinguishes said source from other sources.]

[3. The method of claim 1 further comprising:

registering said image with an agency of government as a trade mark, service mark, or trade name of said owner.]

[4. The method of claim 1, wherein said image is formed by a plurality of elements that together define a trade dress of a product or service of said owner.]

[5. The method of claim 1, wherein said image is a mascot of said owner.]

[6. The method of claim 1, wherein said owner owns a copyright in said image.]

7. The method of claim [6] *1*, wherein said image is a character.

8. The method of claim [6] *1* further comprising: the owner being a source of dolls of said image *of a type that is recognized as representing said source, and said organizational avatar has the appearance of one of said dolls.*

[9. The method of claim 1, wherein said graphic environment is a background being composed with a plurality of tiles.]

[10. The method of claim 9, wherein at least one tile in said plurality has different images and colors from another tile in said plurality.]

[11. The method of claim 9, wherein at least a group of tiles in said plurality are identical.]

[12. The method of claim 9, wherein said background is static relative to a screen of the computer.]

[13. The method of claim 9, wherein at least a part of said background moves relative to a screen of the computer.]

[14. The method of claim 9 further comprising:

using at least a part of the background to identify a product or service of said owner.]

[15. The method of claim 9, wherein at least a part of said background is used for advertising.]

[16. The method of claim 9, wherein at least a part of said background includes a trade name, trade mark, trade dress, or service mark of an organization other than said owner.]

[17. The method of claim 9, wherein at least a portion of said background has an appearance of at least one room.]

[18. The method of claim 9 further comprising changing said background in response to movement of at least a portion of said image.]

[19. The method of claim 1, wherein said representation of the first user, hereinafter "first image", does not identify a source of a product or service; and said image representing said second user is hereinafter "second image", and the method further comprising:

moving at least a portion of said first image in response to operation of a first computer by said first user; and moving at least a portion of said second image in response to operation of a second computer by said second user.]

[20. The method of claim 19 further comprising:

receiving from the first user an instruction to morph; and replacing the first image with a morphed version of said first image.]

[21. The method of claim 19 further comprising:

displaying a third image, hereinafter "object," and automatically moving said object in response to movement of at least one of said first image and said second image.]

[22. The method of claim 19 further comprising said second user using said second image in singing, dancing, telling jokes, or being a magician.]

[23. The method of claim 19 further comprising:

said second user overriding said first users manipulation of said first image at least part of the time.]

[24. The method of claim 19 further comprising:

displaying a indicating a plurality of first images including said first image, wherein each first images does not identify a source of a product or service; and receiving from the first user an identity of said first image, wherein said displaying of first image to represent said first user is performed subsequent to said receiving.]

[25. The method of claim 19 further comprising:

receiving from the first user an identity of an emotion; and replacing the first image with a modified version of said first image to express said emotion.]

[26. The method of claim 25, wherein said emotion is hereinafter "first emotion," and the method further comprises:

receiving from the second user an identity of a second emotion; and replacing the second image with a modified version of said second image to express said second emotion;

wherein said second emotion is one of a second plurality of emotions and said first emotion is one of a first plurality emotions, said second plurality being a subset of said first plurality.]

[27. The method of claim 1 further comprising:

receiving from the first user an identity of one of the physical interactions to be performed with the second user; and replacing at least one of the first image and the second image with a modified version thereof, to perform said one of the physical interactions.]

[28. The method of claim 27 wherein said physical interactions includes punching, shoving or lifting another object in the graphic environment.]

29. The method of claim 1, wherein the message includes a voice recording of one of the first user and the second user.

[30. The method of claim 1, wherein said message includes text and the method further comprises: displaying said text in a first location during receipt of said text, and displaying said text at a second location thereafter.]

[31. The method of claim 1, wherein said displaying is performed by a first computer operated by the first user, the method further comprising:

a server computer receiving the message over a network; and the server computer transmitting the message to a plurality of computers including the first computer and a second computer operated by the second user.]

[32. The method of claim 31, wherein the message is hereinafter "first message" and said server computer supports confidential communication between said first user and said second user, and the method further comprising:

said first user transmitting a second message to said second user via said confidential communication, wherein said second message includes information related to purchase of said product or service;

wherein, during the confidential communication, the server computer transfers the second message to the second user but not to any other users.]

[33. The method of claim 1, wherein said contracting with an owner of an image comprises:

the second user accessing a website of an organization; and downloading said image from said website.]

[34. The method of claim 1 further comprising:

the first user inserting a computer-readable storage medium into a first computer that displays the image; and the first computer reading said image from said storage medium.]

[35. The method of claim 1, wherein said message pertains to customer service or customer survey for an organization.]

[36. The method of claim 1, wherein an organization is a business and said message includes an offer to sell or an advertisement for said product or service.]

[37. The method of claim 1, wherein an organization is a church or a religious institution and said message includes a preaching.]

[38. The method of claim 1, wherein an organization is an educational institution and said message includes a teaching.]

[39. The method of claim 1, wherein a plurality of employees of an organization work in shifts twenty-four hours a day as said second user, to respond to messages from a plurality of first users including said first user.]

40. The method of claim 1, [wherein said image is hereinafter "second image"] the method further comprising:

displaying a first image to represent said first user, wherein said first image identifies said source; [and]

moving at least a portion of said first image in response to [operation of a portion of] *receiving information from* a first computer by said first user; and moving at least a portion of said [second image] *organizational avatar* in response to [operation of a portion of] *receiving information from* a second computer by said second user;

wherein said first computer and said second computer are [included] *communicatively coupled* in [said] *a* system of computers.

41. The method of claim 1, *wherein said representation of said first user is an image that identifies said source, the method* further comprising:

displaying a list indicating a plurality of images including said first image and said second image, wherein [each] *said first* image *and said organizational avatar each* identifies said owner;

receiving from the first user an identity of said first image; and receiving from the second user an identity of said [second image] *organizational avatar*; wherein said displaying of [images] *said organizational avatar to said first user* to represent said [users] *second user* is performed subsequent to said receiving.

42. The method of claim 41 further comprising:

checking if each of said first user and said second user has purchased said product or service; and performing said receiving only after said checking.

43. The method of claim 42 wherein said checking includes:

prompting each user for a password.

[44. A signal encoded in a carrier medium and including instructions to perform the displaying and transferring of claim 1.]

[45. A computer readable storage medium encoded with instructions to perform the displaying and transferring of claim 1.]

[46. A computer system comprising:

a first computer by a first user represented by a first image provided by an organization, said image characterizing a source of a product or service offered by said organization;

a second computer by a second user represented by a second image; and wherein both of said first and second computers are configured to display a graphic environment acceptable to said organization, said first and second images are animated in said graphic environment that is configured to allow various emotional expressions of said first and second users as well as physical interactions, if desired, between said first and second images to emulate an actual physical interaction between said first and second users.]

[47. The system of claim 46 wherein said first image was previously used by said organization to identify itself or to identify a product or service offered by said organization.]

[48. The system of claim 47, wherein said first image comprises a trade mark, trade dress, a trade name or service mark of said organization.]

[49. The system of claim 47, wherein said organization holds a copyright in said image.]

[50. The system of claim 46 further comprising a text message displayed on either one or both of the first and second computers and pertaining to marketing, business transaction, or customer service for the organization.]

51. A method for users to interact with each other, the method comprising:

[an organization using a plurality of images to identify products or services of said organization, each image being owned by said organization;]

[a plurality of users] contracting [with the], *by an* organization *with a plurality of users,* for use of said plurality of images *which identify products or services of said organization with each image being owned by said organization*, each of said *plurality of* images *being an organizational avatar that has the same trade dress that identifies said products or services of said organization so that said organizational avatar is recognized as a source of said product or service;*

*configuring a graphic environment;*

[representing] *said configuring allowing said users to communicate in said graphic environment, and causing said organizational avatar to represent* one of said users in [a] *said* graphic environment [that is configured to allow], *and allowing* various emotional expressions of said users as well as physical interactions, [if desired,] among said users by animating [corresponding] said images to emulate an actual physical interaction among said users;

[a computer operated by each user displaying] *sending* said plurality of images *to computers associated with each of the plurality of users* with each [image] *of the plurality of images* representing one of said users in the graphic environment by moving one of said *plurality of* images towards another one of said *plurality of* images to emulate that one of said *plurality of* users walks towards another one of said *plurality of* users for talking; and

[transferring] *receiving, from a computer associated with one of said plurality of users,* at least one message between said *one of said plurality of users and said another of said plurality of users and controlling said emotional expression of said plurality of* users.

52. The method of claim 51 further comprising: [the organization] selling, *by the organization,* a product to each user prior to said contracting.

53. The method of claim 52, wherein there is a list consisting of descriptions of only said plurality of images.

54. The method of claim 52 further comprising: checking if each user has purchased a product of said organization; and performing said displaying only after said checking.

55. The method of claim 54, wherein each of said images is of a corresponding plurality of products of said organization; and one of said images represents a user only if said user has purchased said [corresponding] product.

56. The method of claim 54, wherein said checking includes:

prompting for a password imprinted on packaging of said product.

57. The method of claim 54, wherein said product is a doll.

58. The method of claim 51 further comprising the organization selling a product to at least one user subsequent to said transferring.

59. The method of claim 51 further comprising displaying a list of images to each user for selection of an image to represent [said] *each* user, said plurality of images forming at least a majority of images described by said list.

60. The method of claim 51, further comprising each computer displaying a background image having a theme in common with said plurality of images.

[61. A signal encoded in a carrier medium and including instructions to perform the displaying and transferring of claim 51.]

[62. A computer readable storage medium encoded with instructions to perform the displaying and transferring of claim 51.]

63. A method for users to interact with each other, the method comprising:

[all users] contracting [with], *by* an organization *with all of the users,* for use of a plurality of characters having a common theme, each character being owned by said organization [and used in]*;*

*configuring* a graphic environment *on a computer* in accordance with the common theme representing the organization*, and providing data for plural characters to interact on the computer in the graphic environment, at least one of the characters being an organizational avatar that has the same trade dress as a product or service of the organization, making said organizational avatar recognized as a source of said product or service*;

[a] *receiving data from said* computer operated by [each user] *at least one user;* displaying said plurality of characters with each character representing one of said users in said graphic environment*;*

[that is configured to allow] *where said configuring controls* said users to express their respective emotional expressions [or] *and to* have physical interactions with each other[, if desired,] to emulate a real environment, said graphic environment being composed by graphic tiles;

[one of said users] *where said configuring also controls* conducting a conversation by *one of said users, including* moving a corresponding one of said [images] *characters* towards another one of said [image] *characters* representing [an] *a* user; and transferring at least one message between said users.

64. The method of claim 63 further comprising *selling, by* the organization [selling], a product to each user prior to said contracting.

65. The method of claim 63 further comprising: checking if each user has purchased a product of said organization; and performing said displaying only after said checking.

66. The method of claim 65, wherein each of said *plurality of* characters is used with a corresponding plurality of products of said organization; and one of said *plurality of* characters represents a user only if said user has purchased *a corresponding one of* said corresponding [product] *plurality of products*.

67. The method of claim 65, wherein said checking includes prompting for a password imprinted on packaging of said product.

68. The method of claim 65, wherein said product is a doll.

69. The method of claim 63 further comprising the organization selling a product to at least one user subsequent to said transferring.

*70. A method of communicating between users, the method comprising:*

*contracting with an owner of an image for use of said image in a graphic environment approved by said owner, said image characterizing a source of a product or service offered by said owner;*

*displaying said image to a first user as an organizational avatar that is recognizable as said source of said product or service to represent a second user communicating with said first user in the graphic environment that is configured to allow various emotional expressions of said first and second users as well as physical interactions, if desired, between a representation of said first user and said organizational avatar representing said*

*second user to emulate an actual physical interaction between said first and second users;*

*transferring a message between said first user and said second user over a network; and*

*controlling emotions of the displayed organizational avatar that represents the second user, said controlling comprising limiting the emotions that the organizational avatar indicative of the image can represent to a first set of limits on emotions for the organizational avatar, wherein said limiting only limits the emotions that the organizational avatar can represent to said first set of limits, and does not limit emotions to all of said first set of limits for at least said first user.*

*71. A method for users to interact with each other, the method comprising:*

*contracting by an organization owning a plurality of images that identify products or services of said organization with a plurality of users, each of said plurality of images being an organizational avatar that is recognizable as identifying said products or services of said organization and said organizational avatar representing one of said users in a graphic environment that is configured to allow various emotional expressions of said users as well as physical interactions, if desired, among said users by animating corresponding said images to emulate an actual physical interaction among said users;*

*transmitting, to at least one of a plurality of computers operated by at least one of the plurality of users, said plurality of images with each of the plurality of images representing one of said users in the graphic environment by moving one of said plurality of images towards another one of said plurality of images to emulate that one of said plurality of users moves towards another one of said plurality of users while talking to said another one of said plurality of users;*

*transferring at least one message from said one of said plurality of users directed to said another of said plurality of users and for controlling said emotional expressions of at least some of said plurality of users; and*

*controlling emotions of the organizational avatar that represents one of the users to limit the emotions that the organizational avatar can represent in a first way that represents a limit on emotions for the organizational avatar, wherein said controlling only limits the emotions that the organizational avatar can represent, and does not limit emotions for other avatars.*

*72. A method for users to interact with each other, the method comprising:*

*contracting, by an organization, with all of the users, for use of a plurality of characters having a common theme, each of said characters being owned by said organization and used in a graphic environment by the users in accordance with the common theme representing the organization and at least one of the characters being an organizational avatar that represents and is recognizable as representing the organization;*

*receiving data on at least one computer operated by at least one user displaying said plurality of characters with each character representing one of said users in said graphic environment that is configured to allow said users to express their respective emotional expressions and to have physical interactions with each other to emulate a real environment, said graphic environment being composed by graphic tiles;*

*conducting, by one of said users, a conversation including moving a corresponding one of said characters towards another one of said characters representing a user;*

*transferring at least one message from said one of said users to another of said users; and*

*limiting emotional expressions which can be presented by those users that represent characters owned by the organization, while not limiting corresponding emotional expressions for other users who do not represent characters owned by the organization.*

*73. The method of claim 1 wherein said trade dress is in the form of a trademark.*

*74. The method of claim 1 wherein said trade dress is in the form of a copyright.*

*75. The method of claim 1 wherein said displaying takes place on a computer used by said first user.*

*76. The method of claim 1 further comprising*

*contracting by an owner of an image with said second user for use of an image by said second user in said graphic environment, said second image characterizing a source of a product or service offered by said owner; and*

*said displaying further comprises displaying said second image to said first user as an organizational avatar that is in the form of intellectual property that is owned by said owner and identifies said owner as a source of a product or service.*

*77. The method of claim 75 wherein said displaying also takes place on a computer used by said second user.*

*78. The method of claim 77 where the image used by said second user is the same as the image used by said first user.*

*79. The method of claim 77 where the image used by said second user is not the same as the image used by said first user.*

*80. The method of claim 77 wherein said trade dress is in the form of a copyright.*

*81. The method of claim 76 further comprising: selling, by the organization, a product to each user.*

*82. The method of claim 76, further comprising:*

*said transferring a message comprises transfer by a computer associated with a user, at least one message between said one of said plurality of users and said another of said plurality of users and for controlling said emotional expressions of said plurality of users.*

* * * * *